United States Patent
Rhodes et al.

(10) Patent No.: US 12,387,410 B2
(45) Date of Patent: Aug. 12, 2025

(54) PREPARATION SYSTEMS FOR EFFICIENTLY GENERATING ALPHA MATTES AND MODIFIED DIGITAL VIDEOS UTILIZING POLARIZED LIGHT

(71) Applicant: Adobe Inc.

(72) Inventors: Tenell Rhodes, Campbell, CA (US); Brian Price, San Jose, CA (US); Kenji Enomoto, Anjo (JP); Kevin Wampler, Seattle, WA (US)

(73) Assignee: Adobe Inc., San Jose, CA (US)

( * ) Notice: Subject to any disclaimer, the term of this patent is extended or adjusted under 35 U.S.C. 154(b) by 350 days.

(21) Appl. No.: 18/177,491

(22) Filed: Mar. 2, 2023

(65) Prior Publication Data

US 2024/0296612 A1    Sep. 5, 2024

(51) Int. Cl.
*G06V 10/60*    (2022.01)
*G06T 7/194*    (2017.01)
*G06T 13/40*    (2011.01)
*G06V 10/771*    (2022.01)

(52) U.S. Cl.
CPC .............. *G06T 13/40* (2013.01); *G06T 7/194* (2017.01); *G06V 10/60* (2022.01); *G06V 10/771* (2022.01)

(58) Field of Classification Search
None
See application file for complete search history.

(56) References Cited

U.S. PATENT DOCUMENTS

2023/0169658 A1    6/2023    Rhodes et al.

OTHER PUBLICATIONS

Morgan McGuire et al.; "Real-time Triangulation Matting using Passive Polarization,"; 2006.
"Illuminant Estimation for Color Constancy: Why spatial domain methods work and the role of the color distribution," Retrieved from the Internet: URL: http://www.cse.yorku.ca/~mbrown/pdf/ColorConstancyJOSAv10.pdf.
Actioncamera.com "Calibrite ColorChecker Passport Duo". [online] 8 pages, [Retrieved on Jan. 13, 2025] Retrieved from the Internet, <URL: https://www.actioncamera.com/shop/calibrite-colorchecker-passport-duo/45deb940-2716-013b-834b-00163ecd2826>.
Alvy Ray Smith and James F Blinn. "Blue Screen Matting". In SIGGRAPH 96 Conference Proceedings, 10 pages, Aug. 1996.

(Continued)

*Primary Examiner* — David H Chu
(74) *Attorney, Agent, or Firm* — Keller Preece PLLC

(57) ABSTRACT

The present disclosure relates to systems, non-transitory computer-readable media, and methods for efficiently automating the preparation of accurate alpha matte animations and modified digital videos utilizing polarized light. For example, the disclosed systems obtain a plurality of polarized digital videos portraying an animation of a foreground subject backlit by a polarized light source. In some embodiments, the disclosed systems generate a plurality of corrected polarized digital videos by adjusting intensity values of the plurality of polarized digital videos based on intensity differences across the plurality of polarized digital videos. The disclosed systems generate an alpha matte animation comprising a plurality of alpha mattes from the plurality of corrected polarized digital videos or from the plurality of polarized digital videos. Utilizing the alpha matte animation, the disclosed systems generate a modified digital video by combining the animation of the foreground subject and a replacement background.

20 Claims, 13 Drawing Sheets

(56) References Cited

OTHER PUBLICATIONS

Anat Levin, Dani Lischinski, and YairWeiss. "A Closed Form Solution to Natural Image Matting". In IEEE Transactions on Pattern Analysis and Machine Intelligence (TPAMI), 30(2):228-242, Feb. 2008.
Christoph Rhemann, Carsten Rother, Jue Wang, Margrit Gelautz, Pushmeet Kohli, and Pamela Rott. "A Perceptually Motivated Online Benchmark for Image Matting". In IEEE Conference on Computer Vision and Pattern Recognition (CVPR), pp. 1826-1833, 2009.
Dmitriy Smirnov, Chloe LeGendre, Xueming Yu, and Paul Debevec. "Magenta Green Screen: Spectrally Multiplexed Alpha Matting with Deep Colorization". In The Digital Production Symposium (DigiPro), 13 pages, arXiv preprint arXiv:2306313702v1, Jun. 23, 2023.
EdmondOptics.com "BFS-U3-51S5P-C USB 3.1". [online] 3 pages, [Retrieved on Jan. 13, 2025] Retrieved from the Internet, <URL: https://www.edmundoptics.com/p/bfs-u3-51s5p-c-usb3-blackflyreg-s-polarization-camera/41357>.
George Gabriel Stokes. "On the Composition and Resolution of Streams of Polarized Light from different Sources". In Proceedings of the Cambridge Philosophical Society: Mathematical and Physical Sciences. vol. 9 of Transactions of the Cambridge Philosophical Society, 14 pages, Feb. 16, 1852.
Hao Lu, Yutong Dai, Chunhua Shen, and Songcen Xu. "Indices Matter: Learning to Index for Deep Image Matting". In ICCV, pp. 3266-3275, 2019.
Hisense-USA.com "55" 4K Uhd Android Smart TV" (2021). [online] 5 pages, [Retrieved on 2025-0113] Retrieved from the Internet, <URL: https://www.hisense-usa.com/support/55a6g-55-4k-uhd-hisense-android-smart-tv-2021>.
Ido Omer and Michael Werman. "Color Lines: Image Specific Color Representation". In Proceedings of the 2004 IEEE Computer Society Conference on Computer Vision and Pattern Recognition (CVPR), pp. 1-8, 2004.
Jiachen Li, Vidit Goel, Marianna Ohanyan, Shant Navasardyan, YunchaoWei, and Humphrey Shi. "VMFormer: End-to-End Video Matting with Transformer". 10 pages, arXiv preprint arXiv:2208.12801v2, Nov. 30, 2022.
Jingwei Tang, Yagiz Aksoy, Cengiz Oztireli, Markus Gross, and Tunc Ozan Aydin. "Learning-based Sampling for Natural Image Matting". In IEEE/CVF Conference on Computer Vision and Pattern Recognition (CVPR), pp. 3055-3063, 2019.
Jizhizi Li, Jing Zhang, and Dacheng Tao. "Deep Image Matting: A Comprehensive Survey". 20 pages, arXiv preprint arXiv:2304.04672v1, Apr. 10, 2023.
Mikhail Erofeev, Yury Gitman, Dmitriy Vatolin, Alexey Fedorov, and JueWang. "Perceptually Motivated Benchmark for Video Matting". In The British Machine Vision Association (BMVC), 12 pages, 2015.
Miki Morimatsu, Yusuke Monno, Masayuki Tanaka, and Masatoshi Okutomi. "Monochrome and Color Polarization Demosaicking Based on Intensity-Guided Residual Interpolation". IEEE Sensors Journal, 21(23):26985-26996, Dec. 1, 2021.
Morgan McGuire, Wojciech Matusik, and William Yerazunis. "Practical, Real-time Studio Matting using Dual Imagers". In Eurographics Conference on Rendering Techniques, 10 pages, 2006.
Ning Xu, Brian Price, Scott Cohen, and Thomas Huang. "Deep Image Matting". In IEEE/CVF Conference on Computer Vision and Pattern Recognition (CVPR), pp. 2970-2979, 2017.
Qifeng Chen, Dingzeyu Li, and Chi-Keung Tang. "KNN Matting". IEEE Transactions on Pattern Analysis and Machine Intelligence (TPAMI), vol. 35, No. 9, 14 pages, Sep. 2013.
Shanchuan Lin, Andrey Ryabtsev, Soumyadip Sengupta, Brian L Curless, Steven M Seitz, and Ira Kemelmacher-Shlizerman. "Real-Time High-Resolution Background Matting". In CVPR, pp. 8762-8771, 2021.
Shaofan Cai, Xiaoshuai Zhang, Haoqiang Fan, Haibin Huang, Jiangyu Liu, Jiaming Liu, Jiaying Liu, Jue Wang, and Jian Sun. "Disentangled Image Matting". In ICCV, pp. 8819-8828, 2019.
Soumyadip Sengupta, Vivek Jayaram, Brian Curless, Steve Seitz, and Ira Kemelmacher-Shlizerman. "Background Matting: The World is Your Green Screen". In IEEE/CVF Conference on Computer Vision and Pattern Recognition (CVPR), pp. 2291-2300, 2020.
Stefan Rahmann and Nikos Canterakis. "Reconstruction of Specular Surfaces using Polarization Imaging". In Proceedings of the 2001 IEEE Computer Society Conference on Computer Vision and Pattern Recognition (CVPR), pp. 1-149-1-155, 2001.
Thomas Porter and Tom Duff. "Compositing Digital Images". ACM SIGGRAPH Computer Graphics, vol. 18, No. 3, pp. 253-259, Jul. 1984.
Tiantian Wang, Sifei Liu, Yapeng Tian, Kai Li, and Ming-Hsuan Yang. "Video Matting via Consistency-Regularized Graph Neural Networks". In IEEE/CVF International Conference on Computer Vision (ICCV), pp. 4902-4911, 2021.
Wei-Lun Huang and Ming-Sui Lee. "End-to-end Video Matting with Trimap Propagation". In CVPR, pp. 14337-14247, 2023.
Xiaoyong Shen, Xin Tao, Hongyun Gao, Chao Zhou, and Jiaya Jia. "Deep Automatic Portrait Matting". In European Conference on Computer Vision (ECCV), Springer, pp. 92-107, 2016.
Yagiz Aksoy, Tunc, Ozan Aydin, Marc Pollefeys, and Aljosa Smollc. "Interactive High-Quality Green-Screen Keying via Color Unmixing". ACM Transactions on Graphics (TOG), 36(4):1, 2016.
Yanan Sun, Chi-Keung Tang, and Yu-Wing Tai. "Semantic Image Matting". In IEEE/CVF Conference on Computer Vision and Pattern Recognition (CVPR), pp. 11120-11129, 2021.
Yanan Sun, Guanzhi Wang, Qiao Gu, Chi-Keung Tang, and Yu-Wing Tai. "Deep Video Matting via Spatio-Temporal Alignment and Aggregation". In IEEE/CVF Conference on Computer Vision and Pattern Recognition (CVPR), pp. 6975-6984, 2021.
Yunke Zhang, Chi Wang, Miaomiao Cui, Peiran Ren, Xuansong Xie, Xian-Sheng Hua, Hujun Bao, Qixing Huang, and Weiwei Xu. "Attention-guided Temporally Coherent Video Object Matting". In Proceedings of the 29th ACM International Conference on Multimedia (ACM MM), 10 pages, arXiv preprint arXiv:2105.11427v3, Jul. 29, 2021.
Yutong Dai, Brian Price, He Zhang, and Chunhua Shen. "Boosting Robustness of Image Matting with Context Assembling and Strong Data Augmentation". In CVPR, pp. 11707-11716, 2022.

PREPARATION SYSTEMS FOR EFFICIENTLY GENERATING ALPHA MATTES AND MODIFIED DIGITAL VIDEOS UTILIZING POLARIZED LIGHT

BACKGROUND

Recent years have seen significant improvement in hardware and software platforms for implementing digital image or digital video matting processes. For example, matting systems can analyze digital images to combine portions of a digital image with an alternative background. For example, chroma key compositing involves capturing video animation of a foreground subject in front of a green background or a blue background, and replacing the green or blue color with the alternative background. Despite these improvements, the technical field suffers from a number of technical deficiencies, including inaccuracy in generating unrealistic and imprecise composite images, inflexibility of operation, and inefficiency in utilizing excessive time and computing resources.

BRIEF SUMMARY

Embodiments of the present disclosure provide benefits and/or solve one or more problems in the art with systems, non-transitory computer-readable media, and methods for generating an alpha matte animation and generating a modified digital video utilizing polarized light. In particular, in one or more embodiments, the disclosed systems generate an alpha matte animation based on a plurality of polarized digital videos portraying an animation of a foreground subject and a polarized light source. For instance, the disclosed systems can utilize a polarized light source to generate marked and unmarked frames of polarized digital videos having different polarization angles. The disclosed systems can utilize these marked and unmarked frames to temporally and spatially crop the polarized digital videos and then utilize the different polarized angles to efficiently correct light intensity values. Specifically, the disclosed systems can utilize a closed-form expression of intensity values across digital videos having different polarization angles to generate a more accurate matte for each frame of the alpha matte animation. In some implementations, the disclosed systems utilize a machine-learning model to generate the alpha matte animation based on the polarized digital videos. Additionally, in some embodiments, the disclosed systems generate the modified digital video based on the alpha matte animation by combining the animation of the foreground subject with a replacement background. Furthermore, in some embodiments, the disclosed systems utilize the resulting composite digital videos to generate a machine-learning training dataset comprising one or more machine-learning training videos (e.g., the modified digital video) and one or more ground truth alpha matte animations (e.g., the alpha matte animation).

The following description sets forth additional features and advantages of one or more embodiments of the disclosed methods, non-transitory computer-readable media, and systems. In some cases, such features and advantages are evident to a skilled artisan having the benefit of this disclosure, or may be learned by the practice of the disclosed embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
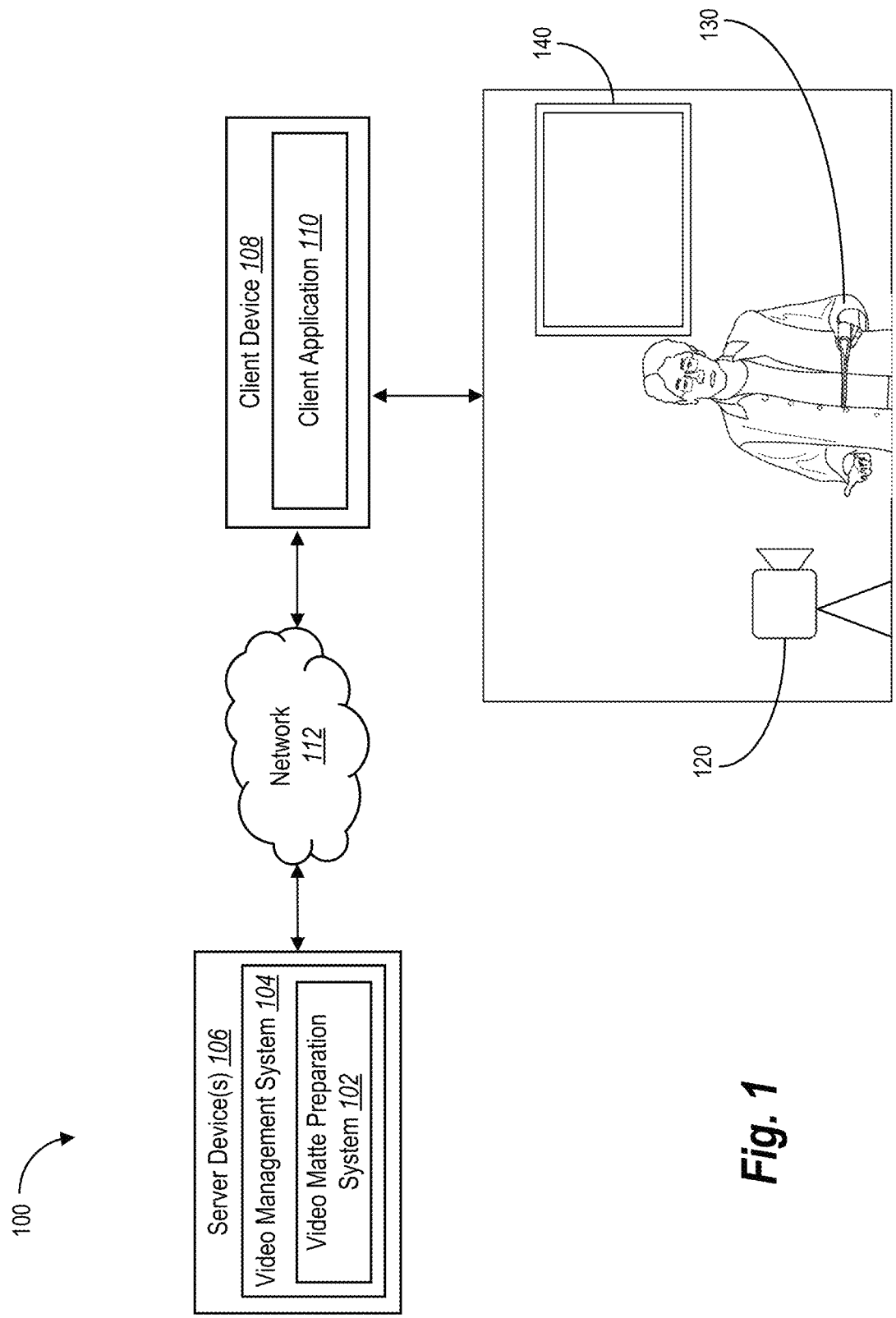
FIG. 1 illustrates a diagram of an environment in which a video matte preparation system operates in accordance with one or more embodiments.

This disclosure describes one or more embodiments of a video matte preparation system that generates an alpha matte animation based on a plurality of polarized digital videos, and generates a modified digital video based on the alpha matte animation. Although some systems can generate masks for compositing video, such systems have a number of problems in relation to accuracy, efficiency, and flexibility of operation. For instance, these systems inaccurately generate masks for a foreground subject. Specifically, existing systems often omit portions of the foreground subject that should be retained in the composited video and/or retain portions of the original background that should be omitted from the composited video. Accordingly, existing systems often generate composite images or videos that include unrealistic artifacts. Furthermore, existing systems poorly capture fine details, such as motion blur and human hair.

Additionally, existing systems are inefficient. To illustrate, these systems often require extensive time, memory, and processing power to generate a composited video. Indeed, existing systems require significant time and computing resources to generate masks at each individual frame and overlay the foreground subject over the alternative background. Thus, preparation of training datasets for video matting machine-learning models utilizing existing systems is cost prohibitive due to substantial computational resources required.

Furthermore, existing systems are inflexible in creating a composited video, requiring many user interactions (e.g., many user inputs, clicks, operations, manual edits). For instance, existing systems require numerous user inputs to setup a video, mask the video, crop the video, overlay the video onto an alternative background, and edit errors in the resulting composited video (such as artifacts from the original background or omissions of portions of the foreground subject). Thus, preparation of training datasets for video matting machine-learning models utilizing existing systems is labor prohibitive. The sheer volume of assets that need to be prepared for a high-quality, large-scale video matting dataset often requires hundreds of hours of manual frame-by-frame edits. For example, a single five-second video recorded at 30 frames per second consists of 150 frames that need different edits, such as spatial or temporal crop, alpha correction, and/or color decontamination before they can be used for training data. Furthermore, traditional solutions to build video matting datasets are too slow and too manual (e.g., stop-motion video), use over-constrained systems (e.g., static objects, high contrast subjects on a simple background, etc.), or use compromised ground-truth assets (e.g., assets having hand-painted alpha values, assets without motion blur, etc.). Therefore, existing solutions are not practical for large-scale video datasets that consist of hundreds or thousands of frames. Indeed, for this reason, in this field there is a lack of available training data reflecting digital videos and corresponding matte animations. The inaccuracy and inflexibility of existing systems has made ground truth matte animations and training datasets inordinately difficult to generate. Moreover, existing systems cannot efficiently composite large datasets of numerous images or videos with fine levels of detail (e.g., fine hair) or rapidly moving objects (e.g., blurred objects), which precludes existing systems from operating at scale.

As mentioned above, in one or more embodiments the video matte preparation system utilizes polarized light and polarized digital videos to efficiently, accurately, and flexibly generate alpha matte animations and composite digital videos. For example, the video matte preparation system generates one or more alpha matte animations and one or more modified digital videos for creating training datasets for video matting machine-learning models. As another example, the video matte preparation system generates a modified digital video of a foreground subject (e.g., a person) composited with a replacement background (e.g., an exotic location or landscape) for digital video editing. By utilizing the techniques described herein, the video matte preparation system can rapidly and seamlessly generate large datasets of alpha matte animations and modified digital videos. As one example, the video matte preparation system crops unnecessary portions of the polarized digital videos without operator input, thereby reducing computer processing demands and eliminating a need for post-processing inputs.

To illustrate, in some implementations, the video matte preparation system obtains a plurality of polarized digital videos portraying an animation of a foreground subject and a polarized light source. The video matte preparation system generates a plurality of correction metrics by comparing pixel-wise intensity values across corresponding frames of the plurality of polarized digital videos. Utilizing the plurality of correction metrics, the video matte preparation system generates a plurality of corrected polarized digital videos by adjusting intensity values of the plurality of polarized digital videos. The video matte preparation system generates a plurality of alpha mattes from the plurality of corrected polarized digital videos. The video matte preparation system generates a modified digital video from the animation of the foreground subject and the plurality of alpha mattes.

In some embodiments, the video matte preparation system spatially and/or temporally crops one or more digital videos to remove unnecessary content from the digital videos. To illustrate, the video matte preparation system detects one or more markers on a polarized light source. The video matte preparation system identifies the one or more markers as indicators of one or more frames of the digital videos to remove in a temporal cropping procedure. To further illustrate, the video matte preparation system generates a spatial mask based on the markers. The video matte preparation system removes, in a spatial cropping procedure, portions of the digital videos that are spatially outside of the spatial mask.

In some implementations, the video matte preparation system adjusts intensity values within the polarized digital videos to correct noise and/or other inaccuracies. For instance, the video matte preparation system utilizes a closed-form expression to efficiently generate pixel-wise intensity correction metrics based on intensity values of corresponding pixels within the polarized digital videos. The video matte preparation system adjusts intensity values of the pixels based on the intensity correction metrics, thereby generating corrected polarized digital videos.

In some embodiments, the video matte preparation system generates an alpha matte animation (e.g., a plurality of alpha matte frames) from the corrected polarized digital videos (or, alternatively, from the original polarized digital videos). Moreover, in some implementations, the video matte preparation system generates one or more modified digital videos, utilizing the alpha matte animation. For instance, the video matte preparation system combines the animation of the foreground subject and the replacement background. For example, the video matte preparation system efficiently generates a composited video, such as a video-conferencing call with a replacement background depicting a city skyline. Similarly, the video matte preparation system can generate a composite video within an entertainment setting with a replacement background depicting an exotic location. In some embodiments, the video matte preparation system generates multiple modified digital videos by combining a single animation of the foreground subject and multiple replacement backgrounds, thereby efficiently generating multiple modified digital videos for a machine-learning training dataset.

In some embodiments, the video matte preparation system harmonizes the animation of the foreground subject with the replacement background. To illustrate, the video matte preparation system utilizes a harmonization machine learning model to harmonize the animation of the foreground subject with the replacement background.

The video matte preparation system provides many advantages and benefits over existing systems and methods. For example, by utilizing polarized digital images in conjunction with correction and harmonization operations, the video matte preparation system improves accuracy of video mattes and modified digital videos relative to existing systems. Specifically, in some embodiments, the video matte preparation system corrects pixel-wise intensity values from polarized digital videos to reduce or eliminate noise, visual artifacts, and/or other inaccuracies in the polarized digital videos. For example, the video matte preparation system generates digital videos with fine details of hair and/or motion blur. In some implementations, the video matte preparation system also reduces or eliminates artifacts from reflected light off a foreground subject by compositing a polarized digital image having a polarization angle orthogonal to the polarized light source. Further, the video matte preparation system harmonizes foreground subjects with replacement backgrounds to conform lighting appearance of a foreground subject with the scene of the replacement background.

Additionally, by performing one or more of the disclosed methods, the video matte preparation system increases efficiency of video matting dataset preparation relative to existing systems. Specifically, in some embodiments, the video matte preparation system spatially and/or temporally crops raw digital videos to decrease required processing operations, memory storage space, and time for generating alpha mattes and modified digital videos. Moreover, in some implementations, the video matte preparation system solves a closed-form expression for intensity correction metrics and intensity value adjustments to dramatically reduce required processing time for intensity corrections. Thus, the video matte preparation system can produce high-quality video training assets much faster than traditional methods.

Furthermore, the video matte preparation system can offer increased flexibility of operation over existing systems. In particular, in some embodiments, the video matte preparation system automatically crops—spatially and/or temporally—the raw digital videos, thereby introducing a new approach that also reduces the number of user interactions to edit a digital video. For instance, the video matte preparation system can reduce a number of parameters and/or manual settings required by existing systems to crop unwanted portions of a captured video. Furthermore, the video matte preparation system can alleviate manual setup steps required by existing systems (for example, chroma key compositing systems require careful setup of lighting to ensure that the green screen is adequately and uniformly lit). To illustrate, in some implementations, by utilizing polarized digital videos, the video matte preparation system composites detailed videos without a need for careful lighting setup. Moreover, the video matte preparation system also flexibly operates across a wide-range of digital videos, including videos with fine detail or rapidly moving objects. Additionally, in some embodiments, the video matte preparation system introduces a new set of operations that allow for seamless creation of a composite digital video, including operations for spatially and/or temporally cropping polarized digital videos, correcting intensities of the polarized digital videos, demosaicing the digital videos, matting the digital videos, compositing the digital videos, and/or harmonizing the digital videos. In some embodiments, the video matte preparation system implements some of these operations utilizing parallel processing, thereby further enhancing efficiency. For example, in some implementations, the video matte preparation system processes the digital videos in parallel (e.g., simultaneously) across all frames, including demosaicing, (optionally) intensity correction, denoising, alpha matting, color decontamination, compositing, and harmonization. Utilizing some or all of the disclosed techniques, the video matte preparation system can produce high-quality ground-truth alpha mattes for finely detailed and varyingly transparent still or moving objects in images and videos.

Additional detail will now be provided in relation to illustrative figures portraying example embodiments and implementations of a video matte preparation system. For example, FIG. 1 illustrates a system 100 (or environment) in which a video matte preparation system 102 operates in accordance with one or more embodiments. As illustrated, the system 100 includes server device(s) 106, a network 112, and a client device 108. As further illustrated, the server device(s) 106 and the client device 108 communicate with one another via the network 112.

As shown in FIG. 1, the server device(s) 106 includes a video management system 104 that further includes the video matte preparation system 102. In one or more embodiments, the video matte preparation system 102 generates a plurality of alpha mattes, such as an alpha matte animation. The video matte preparation system 102 also generates modified digital videos from initial digital videos using the plurality of alpha mattes. In some embodiments, the server device(s) 106 includes, but is not limited to, a computing device (such as explained below in reference to FIG. 13).

In some instances, the video matte preparation system 102 receives a request from the client device 108 to generate a modified digital video. For example, the request includes an instruction to capture a digital video (or receive the digital video from another system) portraying an animation of a foreground subject, and to modify the digital video to overlay the animation of the foreground subject over a replacement background.

In some embodiments, the video matte preparation system 102 captures, utilizing a camera 120, a digital video portraying an animation of a foreground subject 130 and polarized light from a polarized light source 140 behind the foreground subject 130. For example, the camera 120 comprises one or more polarized filters to capture polarized light of various polarization angles. In this manner, the video matte preparation system 102 captures one or more polarized digital videos, each polarized digital video portraying the same scene, but with different light orientations depending on the polarization angle of the light captured in each of the polarized digital videos (i.e., depending on the polarization angle of the polarized filter associated with the particular polarized digital video). Therefore, in some embodiments, the system 100 includes the camera 120 and the polarized light source 140 for use by the video matte preparation system 102. In one or more embodiments, including the illustrated embodiment, the video matte preparation system 102 communicates with the camera 120 and/or the polarized light source 140 through the client device 108. In some embodiments, the video matte preparation system 102 communicates directly with the camera 120 and/or the polarized light source 140 through the network 112. In some embodiments, the video matte preparation system 102 stores the digital videos (e.g., the polarized digital videos) captured by the camera 120. In some embodiments, the video matte preparation system 102 receives the polarized digital videos from another system.

Furthermore, as shown in FIG. 1, the system 100 includes the client device 108. In some embodiments, the client device 108 includes, but is not limited to, a mobile device (e.g., smartphone, tablet), a laptop computer, a desktop computer, or any other type of computing device, including those explained below in reference to FIG. 13. Some embodiments of client device 108 are operated by a user to perform a variety of functions via a client application 110 on client device 108. For example, the client device 108 (through the client application 110) performs functions such as, but not limited to, requesting capture of one or more digital videos, selecting or submitting replacement backgrounds (e.g., selecting replacement background images or replacement background videos stored in a database accessible to the video matte preparation system 102), and/or requesting modification of one or more digital videos with one or more replacement backgrounds.

To access the functionalities of the video matte preparation system 102 (as described above and in greater detail below), in one or more embodiments, a user interacts with the client application 110 on the client device 108. For example, the client application 110 includes one or more software applications (e.g., to interact with and/or modify digital videos in accordance with one or more embodiments described herein) installed on the client device 108, such as a video matte preparation application. In certain instances, the client application 110 is hosted on the server device(s) 106. Additionally, when hosted on the server device(s) 106, the client application 110 is accessed by the client device 108 through a web browser and/or another online interfacing platform and/or tool.

Although FIG. 1 illustrates the video matte preparation system 102 being implemented by a particular component and/or device within the system 100 (e.g., the server device(s) 106), in some embodiments the video matte preparation system 102 is implemented, in whole or in part, by other computing devices and/or components in the system 100. For instance, in some embodiments, the video matte preparation system 102 is implemented on the client device 108 within the client application 110. More specifically, in one or more embodiments, the description of (and acts performed by) the video matte preparation system 102 are implemented by (or performed by) the client application 110 on the client device 108.

In some embodiments, the client application 110 includes a web hosting application that allows the client device 108 to interact with content and services hosted on the server device(s) 106. To illustrate, in one or more implementations, the client device 108 accesses a web page or computing application supported by the server device(s) 106. The client device 108 provides input to the server device(s) 106 (e.g., files of polarized digital videos, selection of a replacement background). In response, the video matte preparation system 102 on the server device(s) 106 performs operations described herein to generate an alpha matte animation and/or a modified digital video. The server device(s) 106 provides the output or results of the operations (e.g., the modified digital video) to the client device 108.

Additionally, as shown in FIG. 1, the system 100 includes the network 112. As mentioned above, in some instances, the network 112 enables communication between components of the system 100. In certain embodiments, the network 112 includes a suitable network and may communicate using any communication platforms and technologies suitable for transporting data and/or communication signals, examples of which are described with reference to FIG. 13. Furthermore, although FIG. 1 illustrates the server device(s) 106 and the client device 108 communicating via the network 112, in certain embodiments, the various components of the system 100 communicate and/or interact via other methods (e.g., the server device(s) 106 and the client device 108 communicate directly).

Figure 2:
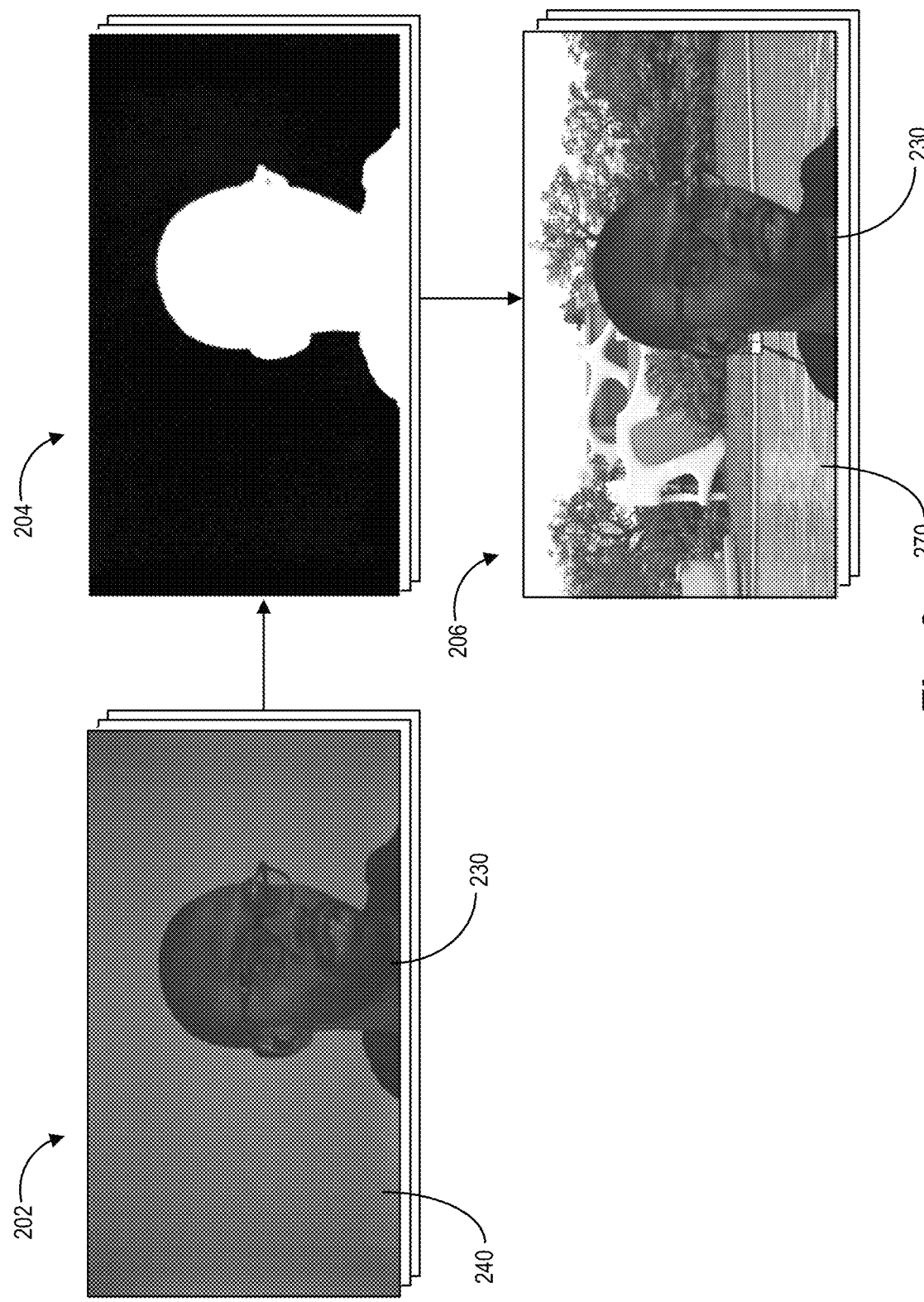
FIG. 2 illustrates an overview of the video matte preparation system generating an alpha matte animation utilizing polarized light and generating a modified digital video utilizing the alpha matte animation in accordance with one or more embodiments.

As discussed above, the video matte preparation system 102 can generate an alpha matte animation and a modified digital video from a plurality of polarized digital videos. For instance, FIG. 2 illustrates the video matte preparation system 102 generating alpha mattes and constructing a modified video utilizing the alpha mattes and based on an input video in accordance with one or more embodiments. Specifically, FIG. 2 shows a process flow in which the video matte preparation system 102 obtains a digital video 202 (e.g., multiple digital images as a series of video frames), generates an alpha matte animation 204 (e.g., multiple alpha mattes as a series of frames of the alpha matte animation), and generates a modified digital video 206 (e.g., multiple modified digital images as a series of modified video frames). In some implementations, the alpha matte animation 204 can be used as is and does not require further edits.

For example, a polarized digital video includes a digital video captured through a polarized filter of a camera. Thus, a polarized digital video comprises frames depicting polarized light at an angle matching a polarization angle of the polarized filter. In addition, a digital video includes one or more videos depicting a scene. In some embodiments, a digital video includes a plurality of polarized digital videos, wherein each of the plurality of polarized digital videos depicts the same scene from the same vantage point. For example, while each of the plurality of polarized digital videos comprise different light orientations based on their polarization angles, they portray the same scene and together make up the digital video. Thus, the description herein of the digital video is also applicable to the plurality of digital videos.

A polarization angle includes an angle at which polarized light is emitted, reflected, or captured. For example, the polarization angle of a polarized light source is the angle at which the polarized light source emits light. Similarly, the polarization angle of a polarized filter is the angle of light at which the polarized filter permits light to pass through.

An animation includes a plurality of frames of a video. Often, an animation includes motion of one or more subjects and/or objects in the video. In some cases, the animation includes only subtle motion, or no motion at all, of the one or more subjects and/or objects. In some embodiments, a foreground subject includes a person or a group of people. In some embodiments, a foreground subject includes an animate or inanimate object.

In some embodiments, a polarized light source includes a light source that emits or reflects polarized light at a particular polarization angle. For example, a polarized light source can include a device that emits light at a 0-degree polarization angle (or any other angle). To illustrate, a polarized light source includes a television or a computer monitor that emits polarized light. As another example, a polarized light source includes a custom polarized light source having a polarized filter (e.g., at a particular polarization angle, such as 0 degrees) and even lighting positioned behind the polarized filter. In some implementations, the polarized light source is positioned behind the foreground subject to provide polarized backlighting for capturing polarized digital videos. In some implementations, the polarized light source is a polarized filter mounted on a diffuse material that reflects ambient light for illumination.

An alpha matte includes a map of values representing foreground (e.g., a binary 1), background (e.g., a binary 0), and combination/alpha values (e.g., a value between 0 and 1). For instance, an alpha matte includes foreground, background, and alpha values for combining two or more images. For example, an alpha matte includes a map of pixel-values in grayscale between white and black (or represented numerically, such as between zero and one). To illustrate, an alpha matte contains pixel-wise information about how much of an input image to retain in an output image.

An alpha matte animation includes a series or sequence of a plurality of alpha mattes. For instance, and alpha matte animation contains pixel-wise information about how much of an animation of a foreground subject to retain and how much of a replacement background to retain in a combined animation (e.g., a modified digital video).

A modified digital video includes a digital video of a foreground subject with at least a portion of the digital video replaced with pixels of a replacement background. For example, a modified digital video is a video of the animation of the foreground subject superimposed over a replacement background.

A replacement background is a background different from the background of an original digital video (e.g., different from the backlighting of the polarized light source). For instance, a replacement background is a view of a different scene than the scene of the original capture of the digital video. In some embodiments, a replacement background is a still-frame image for multiple frames of the animation of the foreground subject. In some embodiments, a replacement background is a video of a scene (e.g., a replacement background video).

As shown in FIG. 2, the video matte preparation system 102 captures the digital video 202 portraying an animation of a foreground subject 230 backlit by a polarized light source 240. For example, the video matte preparation system 102 captures the digital video 202 utilizing one or more polarized filters of a camera. Thus, the video matte preparation system 102 captures the digital video 202 comprising one or more polarized digital videos portraying the animation of the foreground subject 230 backlit by the polarized light source 240. In some embodiments, the video matte preparation system 102 captures two polarized digital videos portraying the animation. In some embodiments, the video matte preparation system 102 captures three polarized digital videos portraying the animation. In some embodiments, the video matte preparation system 102 captures four polarized digital videos portraying the animation. In some embodiments, the video matte preparation system 102 captures five, six, or more polarized digital videos portraying the animation.

In some implementations, the video matte preparation system 102 obtains the digital video 202 portraying the animation of the foreground subject 230 backlit by the polarized light source 240. For example, the video matte preparation system 102 obtains the digital video 202 without directly capturing the digital video 202. To illustrate, the video matte preparation system 102 obtains the digital video 202 comprising the one or more polarized digital videos portraying the animation of the foreground subject 230 backlit by the polarized light source 240. For example, the video matte preparation system 102 receives the plurality of polarized digital videos from another system that previously captured and/or stored the plurality of polarized digital videos.

In capturing multiple polarized digital videos of the same scene, the video matte preparation system 102 can capture frames across the polarized digital videos that correspond to the same points in time. Accordingly, corresponding frames (or matching frames) include frames of a plurality of digital videos (e.g., the plurality of polarized digital videos) captured at the same time (or nearly the same time, such as within a hundredth of a second threshold) and reflecting the same scene with the same vantage point (or nearly the same vantage point, such as within one millimeter). For example, corresponding frames are the several frames captured at the same instant by a camera with multiple filters. In some cases, the foreground subject is motionless or nearly motionless (such as a still object). Thus, corresponding frames of the polarized digital videos can include frames captured at different times. To illustrate, the video matte preparation system 102 captures a frame of a first polarized digital video utilizing a polarization filter having a first polarization angle, a frame of a second polarized digital video utilizing a polarization filter having a second polarization angle, and so forth. These frames, each depicting the same still object in the same orientation, are corresponding frames notwithstanding being captured at different times.

Similarly, corresponding pixels (or matching pixels) across frames of polarized digital videos are pixels in corresponding frames at the same location (or nearly the same location, such as within a 2 pixel radius). For example, the upper-left-most pixels of corresponding frames of polarized digital videos are corresponding pixels. In some embodiments, a camera with multiple polarization filters captures and stores light in a grid (e.g., a two-by-two grid) of pixels, with one or more pixels in the grid captured by one filter, and one or more other pixels in the grid captured by another filter, etc. In such embodiments, the pixels in the grid are corresponding pixels.

As shown FIG. 2, the video matte preparation system 102 generates alpha mattes from the plurality of polarized digital videos. For example, the video matte preparation system 102 utilizes the plurality of polarized digital videos to construct the alpha matte animation 204. The alpha matte animation 204 includes a plurality of alpha mattes (e.g., one alpha matte for each frame of the animation). Accordingly, the alpha matte animation 204 represents a degree to which the foreground subject 230 obstructs the polarized light source 240 in the digital video 202. For example, where a portion of the foreground subject 230 fully obstructs the polarized light source 240, the alpha matte animation 204 has white pixels (e.g., represented by the numeral 1). Where another portion of the foreground subject 230 partially obstructs the polarized light source 240, the alpha matte animation 204 has gray pixels (e.g., represented by a numeral between 0 and 1). Where the foreground subject 230 does not obstruct the polarized light source 240, the alpha matte animation 204 has black pixels (e.g., represented by the numeral 0).

The example of the alpha matte animation depicted in FIG. 2 is illustrative and nonlimiting. For instance, in some embodiments, the alpha matte animation has black pixels corresponding to opaque portions of the foreground subject 230, and white pixels corresponding to portions without the foreground subject 230. In some embodiments, the pixels of the alpha matte animation are not represented by colors, but rather by numbers in an array denoting, for example, a percentage of pixels of the foreground subject 230 to combine with a replacement background 270 to create a modified digital video 206.

Utilizing the alpha matte animation 204, the video matte preparation system 102 generates the modified digital video 206 by combining the foreground subject 230 and a replacement background 270. For example, the video matte preparation system 102 superimposes pixels of the digital video 202 corresponding with the foreground subject 230 onto the replacement background 270. In some embodiments, the replacement background 270 is a digital image. In some embodiments, the replacement background 270 is a digital video.

In some embodiments, the video matte preparation system 102 combines the pixels of the foreground subject 230 from the digital video 202 with the replacement background 270 based on the alpha matte animation 204. For example, the video matte preparation system 102 utilizes the pixel-wise values of the alpha matte animation 204 to combine colors of the pixels of the replacement background 270 with the colors of the pixels of the foreground subject 230 in the digital video 202. For instance, if a particular pixel of the alpha matte animation 204 is represented by the numeral 0.5, the video matte preparation system 102 generates a corresponding pixel of the modified digital video 206 by averaging (equally) the corresponding pixels of the digital video 202 and the replacement background 270.

In some implementations, the video matte preparation system 102 utilizes a weighted average of pixels to generate the modified digital video 206. For instance, if a particular pixel of the alpha matte animation 204 is represented by the numeral 0.8 (e.g., the foreground subject 230 is 80% opaque and 20% transparent), the video matte preparation system 102 combines the corresponding pixels of the digital video 202 and the replacement background 270 by weighting the corresponding pixel of the digital video 202 four times more than the corresponding pixel of the replacement background.

Figure 3:
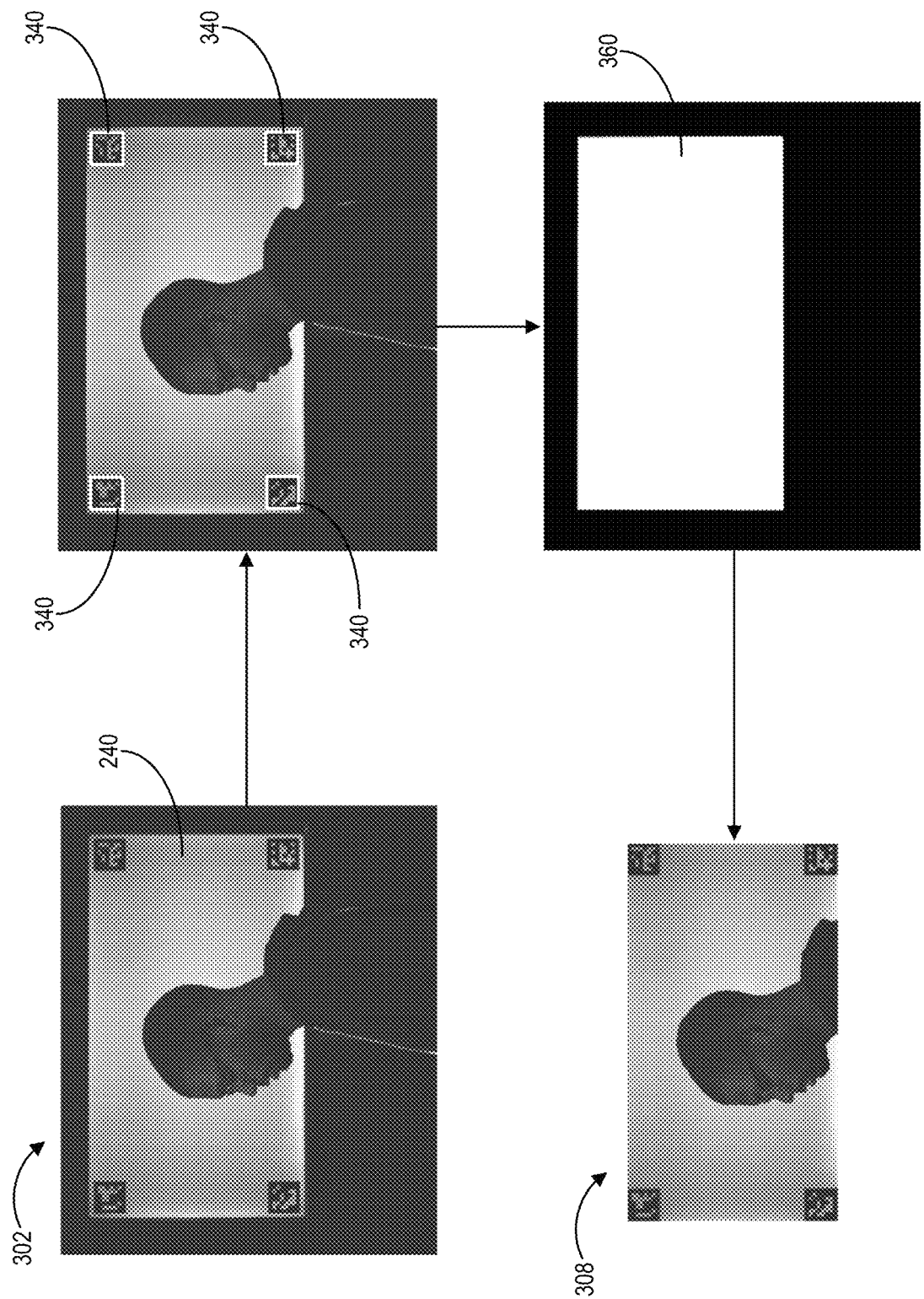
FIG. 3 illustrates the video matte preparation system spatially cropping a digital video in accordance with one or more embodiments.

As mentioned above, the video matte preparation system 102 can spatially crop a digital video. Specifically, FIG. 3 illustrates the video matte preparation system 102 obtaining a digital video 302, detecting markers 340 in the digital video 302, generating a spatial mask 360 for the digital video 302, and removing portions of the digital video 302 to create a spatially cropped digital video 308, in accordance with one or more embodiments.

For example, the video matte preparation system 102 spatially crops the digital video 302 (e.g., the digital video 202) by spatially cropping the plurality of polarized digital videos. In this way, the video matte preparation system 102 removes corresponding portions (e.g., portions comprising corresponding pixels within corresponding frames) of each of the plurality of polarized digital videos.

As mentioned, the video matte preparation system 102 can include markers. For example, a marker includes a symbol or identifiable visual indicator. For example, in some implementations a marker includes a digital marker, such as a QR code or other visual encoding of information. The QR code, for example, can reflect embedded information, such as a video title, a time, or a location. In some cases, a marker includes a physical marker, such as light cast onto a scene (e.g., a laser) or a physical sign (e.g., a placard held at a particular location in physical space). In some embodiments, a marker includes a hybrid marker comprising both digital and physical elements, such as a combination of light cast onto the scene and a digital symbol in the polarized light source. Similarly, a marker frame includes a frame of a polarized digital video that portrays polarized light having one or more markers. Moreover, a non-marker frame includes a frame of a polarized digital video that does not portray polarized light having one or more marker. While a non-marker frame does portray polarized light, it does not include markers.

In some implementations, the video matte preparation system 102 prepares a spatial mask based on one or more markers. For example, a spatial mask includes a map identifying pixels to include or exclude from a digital video. To illustrate, a spatial mask can include a binary mask (e.g., comprising ones and zeros) that informs which portions of a frame of a digital video to remove in a cropping technique.

In relation to FIG. 3, the video matte preparation system 102 detects the markers 340 in the digital video 302. For instance, the video matte preparation system 102 observes a plurality of markers 340 on one or more frames of the digital video 302. To illustrate, the plurality of polarized digital videos comprises marker frames portraying the polarized light source 240 having the plurality of markers 340. In FIG. 3, the digital video 302 portrays the polarized light source 240 with four markers 340: one marker 340 in each corner of the polarized light source 240. This configuration is illustrative and nonlimiting. In some embodiments, the video matte preparation system 102 detects more or fewer than four markers 340. In some embodiments, the markers 340 are arranged in patterns other than the rectangular pattern shown in FIG. 3.

As shown in FIG. 3, the video matte preparation system 102 generates a spatial mask 360 based on the detected markers 340. For example, the video matte preparation system 102 determines locations (e.g., pixels) of the plurality of markers 340 and creates the spatial mask 360 to enclose the locations of the plurality of markers 340. To illustrate, in some implementations, the video matte preparation system 102 determines pixels to retain for the spatially cropped digital video 308, and other pixels to remove from the digital video 302 (i.e., exclude from the spatially cropped digital video 308). In some implementations, the video matte preparation system 102 determines an initial region by connecting the plurality of markers 340 and then determines the spatial mask 360 by expanding the initial region (e.g., by expanding by a threshold number of pixels such as 10, 20, or 50). Thus, the spatial mask comprises information about which pixels to retain and which pixels to remove.

In some embodiments, the video matte preparation system 102 spatially crops the plurality of polarized digital videos utilizing the plurality of markers 340 from the polarized light source 240 portrayed in the marker frames. For instance, the video matte preparation system 102 utilizes the spatial mask 360 to remove portions of the digital video 302 (e.g., portions of the plurality of polarized digital videos) that are outside of the spatial mask. In some embodiments, the video matte preparation system 102 generates a new digital video (e.g., the spatially cropped digital video 308, and/or a plurality of spatially cropped polarized digital videos). In some embodiments, the video matte preparation system 102 modifies the original video (e.g., the digital video 302, and/or the plurality of polarized digital videos) to create the spatially cropped digital video 308 by removing the portions outside of the spatial mask (e.g., without necessarily generating the new digital video).

In some implementations, the video matte preparation system 102 detects the markers 340 on some frames (e.g., one or more marker frames) of the digital video 302, and not on other frames (e.g., one or more non-marker frames) of the digital video 302. To illustrate, the plurality of polarized digital videos comprises marker frames and non-marker frames, wherein the marker frames portray the polarized light source 240 having the plurality of markers 340, and wherein the non-marker frames portray the polarized light source 240 without the plurality of markers 340. In some embodiments, the video matte preparation system 102 spatially crops the digital video 302 (e.g., spatially crops the plurality of polarized digital videos) by cropping the non-marker frames of the digital video 302. In this way, the video matte preparation system 102 generates a spatial mask 360 for the non-marker frames based on the plurality of markers 340 from the polarized light source 240 portrayed in the marker frames. Then, the video matte preparation system 102 removes portions of the non-marker frames that are outside of the spatial mask 360.

By spatially cropping the plurality of polarized digital videos, in some embodiments the video matte preparation system 102 provides enhanced efficiency over existing video matting systems. For instance, by automatically removing portions of the polarized digital videos, the video matte preparation system 102 reduces memory storage size requirements for the digital videos, as well as processing resources and processing time for additional operations and/or techniques described herein, resources and time that would otherwise be consumed operating on those removed portions were they to remain in the polarized digital videos.

Additionally, by utilizing the markers and automatically generating a spatial mask, in some embodiments the video matte preparation system 102 alleviates otherwise necessary inputs, clicks, steps, and/or operations to crop and/or edit the digital videos. To illustrate, by utilizing the spatial cropping techniques described above, the video matte preparation system 102 can eliminate a need for carefully aligning the camera with the polarized light source 240. In general, portions of the digital video 302 outside of the polarized light source 240 would not yield viable alpha mattes for video compositing (e.g., the light intensity for pixels outside of the polarized light source 240 would generally be approximately equal for each of the plurality of polarized digital videos, and thus the alpha mattes would not correctly differentiate between the foreground subject and the background in those areas outside of the polarized light source 240). Thus, by spatially cropping the plurality of polarized digital videos in accordance with some embodiments as described herein, the video matte preparation system 102 alleviates otherwise necessary setup steps (such as carefully aligning and zooming the camera to line up with the polarized light source 240) and/or alleviates otherwise necessary post-processing steps to spatially crop the plurality of polarized digital videos.

Figure 4:
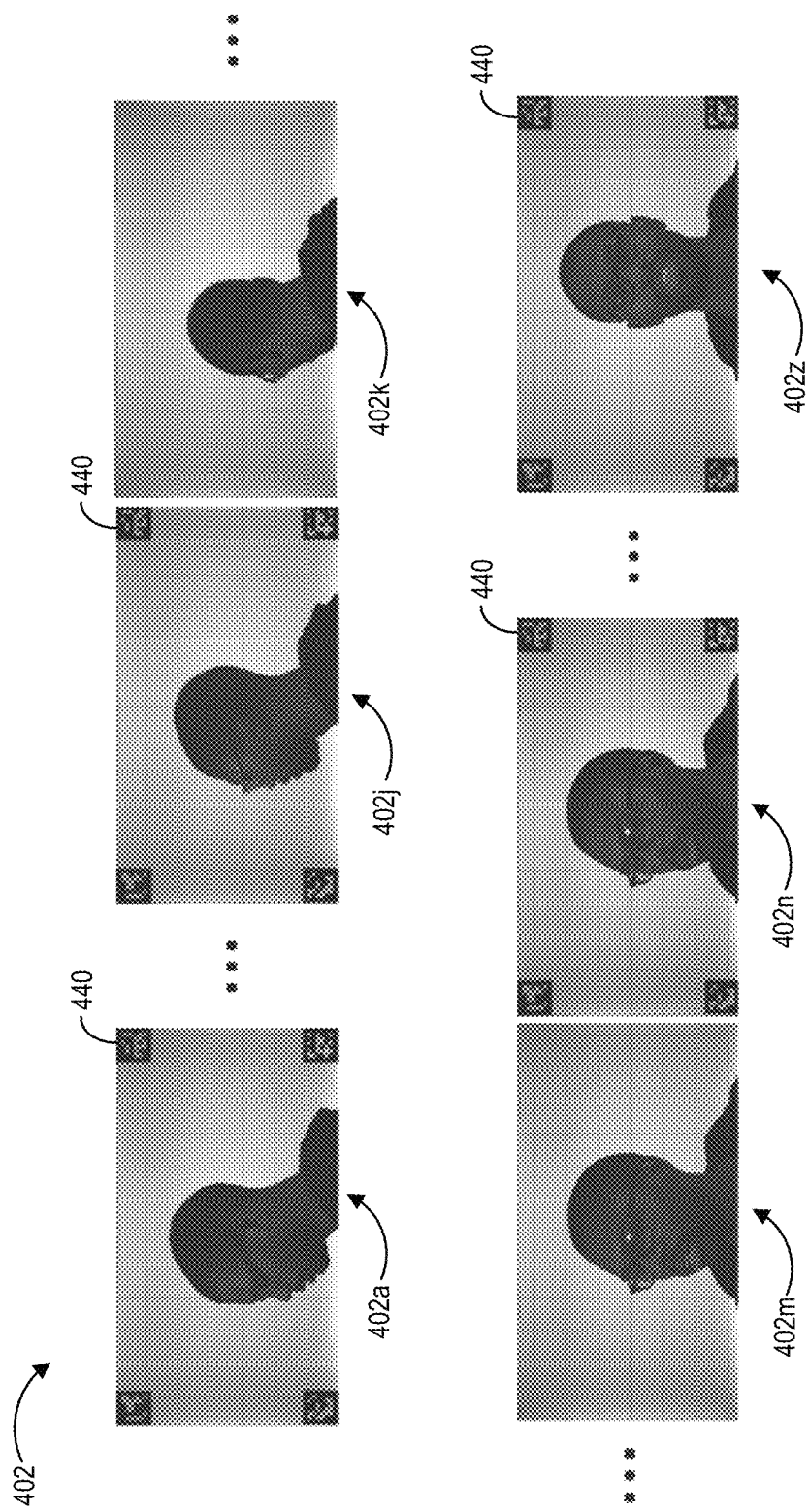
FIG. 4 illustrates the video matte preparation system temporally cropping a digital video in accordance with one or more embodiments.

As also mentioned, the video matte preparation system 102 can temporally crop a digital video. For example, FIG. 4 illustrates the video matte preparation system 102 obtaining a digital video 402 comprising frames 402a-402z and temporally cropping a subset of the frames 402a-402z from the digital video 402, in accordance with one or more embodiments. As explained above, description herein of a singular digital video is illustrative and nonlimiting, and applies equally to a plurality of polarized digital videos (e.g., each polarized digital video comprises corresponding frames 402a-402z).

For example, in some implementations, the video matte preparation system 102 detects one or more marker frames within the digital video 402, and one or more non-marker frames within the digital video 402. For instance, similar to the description above in connection with FIG. 3, the video matte preparation system 102 detects one or more markers 440 on some frames (e.g., one or more marker frames) of the digital video 402, and not on other frames (e.g., one or more non-marker frames) of the digital video 402. To further illustrate, the digital video 402 comprises marker frames 402a-402j and 402n-402z, and non-marker frames 402k-402m, wherein the marker frames 402a-402j and the marker frames 402n-402z portray the polarized light source having the plurality of markers 440, and wherein the non-marker frames 402k-402m portray the polarized light source without the plurality of markers 440.

The video matte preparation system 102 temporally crops the digital video 402 by removing the marker frames 402a-402j and the marker frames 402n-402z from the digital video 402, while retaining the non-marker frames 402k-402m. Thus, in some embodiments, the video matte preparation system 102 creates a temporally cropped digital video consisting of the non-marker frames 402k-402m.

Similar to the description above in connection with FIG. 3, in some embodiments, the video matte preparation system 102 generates a new digital video (or a plurality of new polarized digital videos) comprising the temporally cropped digital video (or a plurality of temporally cropped polarized digital videos) without the marker frames 402a-402j and without the marker frames 402n-402z. In some embodiments, the video matte preparation system 102 modifies the original video (e.g., the digital video 402, and/or the plurality of polarized digital videos) to create the temporally cropped digital video by removing the marker frames 402a-402j and the marker frames 402n-402z (e.g., without necessarily generating the new digital video). In some embodiments, the digital video 402 comprises one or more marker frames 402a-402j and one or more non-marker frames 402k-402m, without additional marker frames 402n-402z following the non-marker frames 402k-402m.

By temporally cropping the plurality of polarized digital videos, the video matte preparation system 102 can provide enhanced efficiency over existing video matting systems. For instance, by automatically removing frames of the polarized digital videos, in some implementations the video matte preparation system 102 reduces memory storage size requirements for the digital videos, as well as processing resources and processing time for additional operations and/or techniques described herein, resources and time that would otherwise be consumed operating on those removed frames were they to remain in the polarized digital videos. Additionally, by utilizing the marker frames and the non-marker frames to automatically remove the marker frames, in one or more embodiments the video matte preparation system 102 alleviates unnecessary inputs, clicks, steps, and/or operations to crop and/or edit the digital videos.

Figure 5:
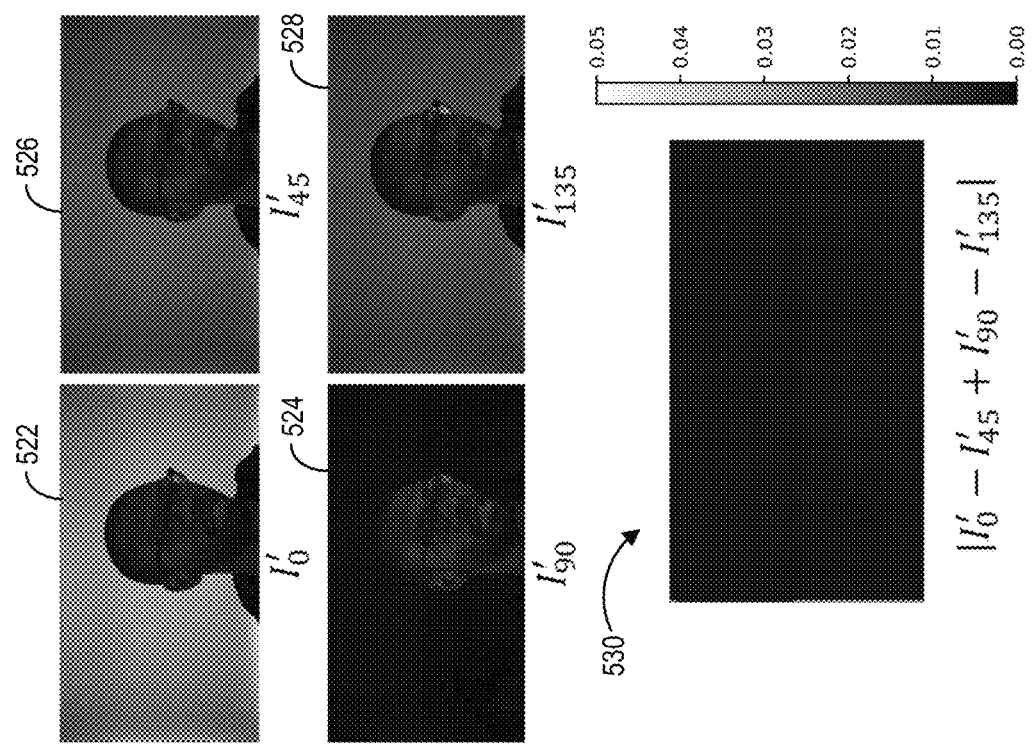
FIG. 5 illustrates the video matte preparation system generating corrected polarized digital videos in accordance with one or more embodiments.

As mentioned above, the video matte preparation system 102 can adjust light intensity values for the plurality of polarized digital videos. For instance, FIG. 5 illustrates, in accordance with one or more embodiments, the video matte preparation system 102 comparing pixel-wise intensity values across corresponding frames of the plurality of polarized digital videos and generating a plurality of corrected polarized digital videos by adjusting intensity values of the plurality of polarized digital videos. A corrected polarized digital video includes a polarized digital video that has been adjusted using intensity correction techniques. Similarly, an intensity value includes a measurement or other parameter representing light intensity, brightness, luminosity, radiance, or luminance. For example, an intensity value includes a measure of an amount of light portrayed in a digital video, and in particular, in a pixel of the digital video.

Specifically, FIG. 5 shows a frame 502 of a first polarized digital video, a frame 504 of a second polarized digital video, a frame 506 of a third polarized digital video, and a frame 508 of a fourth polarized digital video. The frames 502, 504, 506, and 508 are corresponding frames, meaning that they correspond to the same moment in time of capture of the digital video and, therefore, portray the same foreground subject in the same pose. However, the frames 502, 504, 506, and 508 portray different intensities of background light because the frames 502, 504, 506, and 508 were each captured through different polarized filters of a camera. To illustrate, frame 502 comprises polarized light at a first polarization angle (e.g., 0 degrees), frame 504 comprises polarized light at a second polarization angle orthogonal to the first polarization angle (e.g., 90 degrees), frame 506 comprises polarized light at a third polarization angle (e.g., 45 degrees), and frame 508 comprises polarized light at a fourth polarization angle orthogonal to the third polarization angle (e.g., 135 degrees).

The description herein of polarization angles of 0, 45, 90, and 135 degrees is exemplary only. In some embodiments, the video matte preparation system 102 utilizes polarization angles having other values (e.g., 1, 46, 91, and 136 degrees). In some preferred embodiments, one of the polarization angles is orthogonal to the polarization angle of the polarized light source. For instance, if the polarized light source emits light at a polarization angle of 0 degrees, the video matte preparation system 102 obtains a polarized digital video (e.g., the second polarized digital video) comprising polarized light at 90 degrees (as well as unpolarized light). In this way, in one of the polarized digital videos, the video matte preparation system 102 can block out the polarized light from the polarized light source.

As depicted in FIG. 5, the frame 502 comprises relatively bright light from the background polarized light source, while frame 504 comprises essentially no light from the background polarized light source. This is because the polarized filter through which frame 502 was captured is aligned with the polarization angle of the polarized light source, whereas the polarized filter through which frame 504 was captured is orthogonal to the polarization angle of the polarized light source. Relatedly, frames 506 and 508 each comprise moderately bright light from the polarized light source, because they were captured through polarized filters that are angled (neither orthogonal nor directly aligned) with the polarization angle of the polarized light source.

In some embodiments, the video matte preparation system 102 measures intensity values of light in the polarized digital videos. For example, the video matte preparation system 102 measures pixel-wise intensity values in frames 502, 504, 506, and 508. In theory, for any given pixel and its corresponding pixels across corresponding frames 502, 504, 506, and 508, the intensity values should (approximately) satisfy the following equation:

$$I_0 + I_{90} = I_{45} + I_{135}$$

where the variables I represent light intensity values; the subscripts 0 and 90 denote a first polarization angle aligned with the polarized light source and a second polarization angle orthogonal to the first polarization angle, respectively; and the subscripts 45 and 135 denote a third polarization angle and a fourth polarization angle orthogonal to the third polarization angle, respectively. In some embodiments, the third and fourth polarization angles have 45 degree offsets from the first and second polarization angles. Thus, the sum of intensity values of the first and second polarization angles should (approximately) equal the sum of intensity values of the third and fourth polarization angles.

In practice, the measured intensity values do not always satisfy this equation. To illustrate, noise and visual artifacts are introduced into the captured polarized digital videos. For example, ambient light (which is generally unpolarized) can, when reflected off of a surface of the foreground subject, become polarized. In some embodiments, the video matte preparation system 102 compares pixel-wise intensity values across corresponding frames of the plurality of polarized digital videos. For example, the video matte preparation system 102 computes pixel-wise magnitudes of intensity differences across the plurality of polarized digital videos. An intensity difference includes a metric representing a pixel-wise comparison of two or more intensity values. Thus, an intensity difference represents differences in the amount, radiance, brightness, luminosity, or luminance of light portrayed in corresponding pixels of corresponding frames of a plurality of digital videos (e.g., a plurality of polarized digital videos). In some embodiments, the video matte preparation system 102 computes intensity differences according to the following formula:

$$|I_0 - I_{45} + I_{90} - I_{135}|$$

As explained above, these magnitudes of intensity differences should, in theory, equal zero (or approximately zero). The video matte preparation system 102 determines these intensity differences for each pixel across corresponding frames of the polarized digital videos. As illustrated in FIG. 5, in some embodiments, the video matte preparation system 102 generates a heat map 510 of intensity differences for a frame of the digital video (e.g., for corresponding frames of the polarized digital videos). As can be seen in FIG. 5, the heat map 510 demonstrates noise and/or artifacts in the polarized digital videos. For example, a locus of nonzero intensity differences can be seen in the heat map 510 (the locus outlining the pose of the foreground subject in the digital video).

An intensity correction metric, or simply a correction metric, includes a measure for adjusting light intensities in corresponding pixels of the polarized digital videos. For example, an intensity correction metric defines an extent to which corresponding pixels violate a condition of light intensity balance. Accordingly, an intensity correction metric represents how much corresponding pixels should be adjusted (e.g., as part of an intensity correction technique).

In some implementations, the video matte preparation system 102 adjusts the intensity values for the various pixels of the polarized digital videos. To illustrate, the video matte preparation system 102 generates correction metrics for the polarized digital videos. The correction metrics include pixel-wise metrics that represent an extent to which the determined intensity differences at the various pixels are nonzero. The video matte preparation system 102 utilizes the correction metrics to adjust light intensities in the polarized digital videos, thereby reducing or eliminating noise and/or visual artifacts in the polarized digital videos.

In some embodiments, the video matte preparation system 102 generates correction metrics according to the following equation:

$$s = \frac{I_0 - I_{45} + I_{90} - I_{135}}{\sum_\phi I_\phi^2}$$

where the s is a correction metric (i.e., a scalar correction metric) for a particular pixel in the digital video. The denominator contains an overall intensity value, in which the intensity values are squared and summed (i.e., $\phi$ represents a summation index for each of the plurality of polarized digital videos). The video matte preparation system 102 generates unique values of the intensity correction metric s for each pixel of a digital video.

In some implementations, the video matte preparation system 102 generates an overall intensity value. An overall intensity value includes a combination of intensity values of corresponding pixels. In some embodiments, an overall intensity value is a sum of the squares of the corresponding pixels' intensity values.

To adjust the intensity values of the polarized digital videos, in some embodiments, the video matte preparation system 102 utilizes the intensity correction metrics according to the following closed-form expressions:

$$I'_0 = I_0(1 - sI_0)$$
$$I'_{45} = I_{45}(1 + sI_{45})$$
$$I'_{90} = I_{90}(1 - sI_{90})$$
$$I'_{135} = I_{135}(1 + sI_{135})$$

where the variables I' are adjusted intensity values. The video matte preparation system 102 solves these closed-form expressions of intensity values for the polarized digital videos to generate the adjusted intensity values. An adjusted intensity value includes a value of light intensity for a pixel of a polarized digital video that has been corrected (e.g., according to an intensity correction technique).

In some embodiments, the video matte preparation system 102 utilizes the adjusted intensity values to generate corrected polarized digital videos. For instance, FIG. 5 shows frames of corrected polarized digital videos (although these corrections may not be observable at the scale of FIG. 5). Specifically, frame 522 is a corrected frame based on frame 502 of the first polarized digital video, frame 524 is a corrected frame based on frame 504 of the second polarized digital video, frame 526 is a corrected frame based on frame 506 of the third polarized digital video, and frame 528 is a corrected frame based on frame 508 of the fourth polarized digital video.

In some implementations, the video matte preparation system 102 generates a heat map 530 of intensity differences for a frame of the corrected digital video (e.g., for corresponding frames of the corrected polarized digital videos). As can be seen in FIG. 5, the heat map 530 demonstrates that the noise and/or artifacts (which are visible in heat map 510 for the polarized digital videos) has been removed and is not present in the corrected polarized digital videos. For example, as can be seen in the heat map 530, the intensity differences are zero for all pixels of the corresponding frames of the corrected polarized digital videos.

The process of correcting intensities in the polarized digital videos has several advantages that can enhance the quality and efficiency of the video matte preparation system 102. For instance, by generating the corrected polarized digital videos, in one or more embodiments the video matte preparation system 102 reduces or removes noise and/or visual artifacts from the digital video, thereby increasing the accuracy of alpha matte animations and modified digital videos. For example, as can be seen in the heat map 510, the noise represented by the nonzero intensity differences would cause inaccuracies around the outline of the foreground subject (e.g., blurred hairlines, unrealistic boundaries between the foreground subject and the replacement background, etc.). However, by applying intensity correction (i.e., by generating corrected polarized digital videos), the video matte preparation system 102 can reduce or eliminate noise (as seen in the heat map 530), thereby enhancing the quality of the alpha mattes and the modified digital videos. As discussed in further detail below, in one or more embodiments the video matte preparation system 102 generates high-quality modified digital videos with crisp and finely detailed boundaries between a foreground subject and a replacement background, and with detailed translucent portions of the alpha mattes that represent motion blur or translucent surfaces with other objects visible in the background.

In addition, by applying the process described above of solving closed-form expressions of intensity values, the video matte preparation system 102 can efficiently generate the corrected polarized digital videos. For instance, the closed-form expressions of intensity values yield direct solutions, and do not require iterative or recursive methods for solving for the adjusted intensity values. In this way, the video matte preparation system 102 can increase efficiency over existing video matting systems by reducing required computational steps and time. Furthermore, the video matte preparation system 102 can increase flexibility over existing video matting systems by reducing or eliminating otherwise-required manual adjustment of inaccuracies around the outline of the foreground subject (e.g., in post-production revisions to the alpha matte animation).

Figure 6:
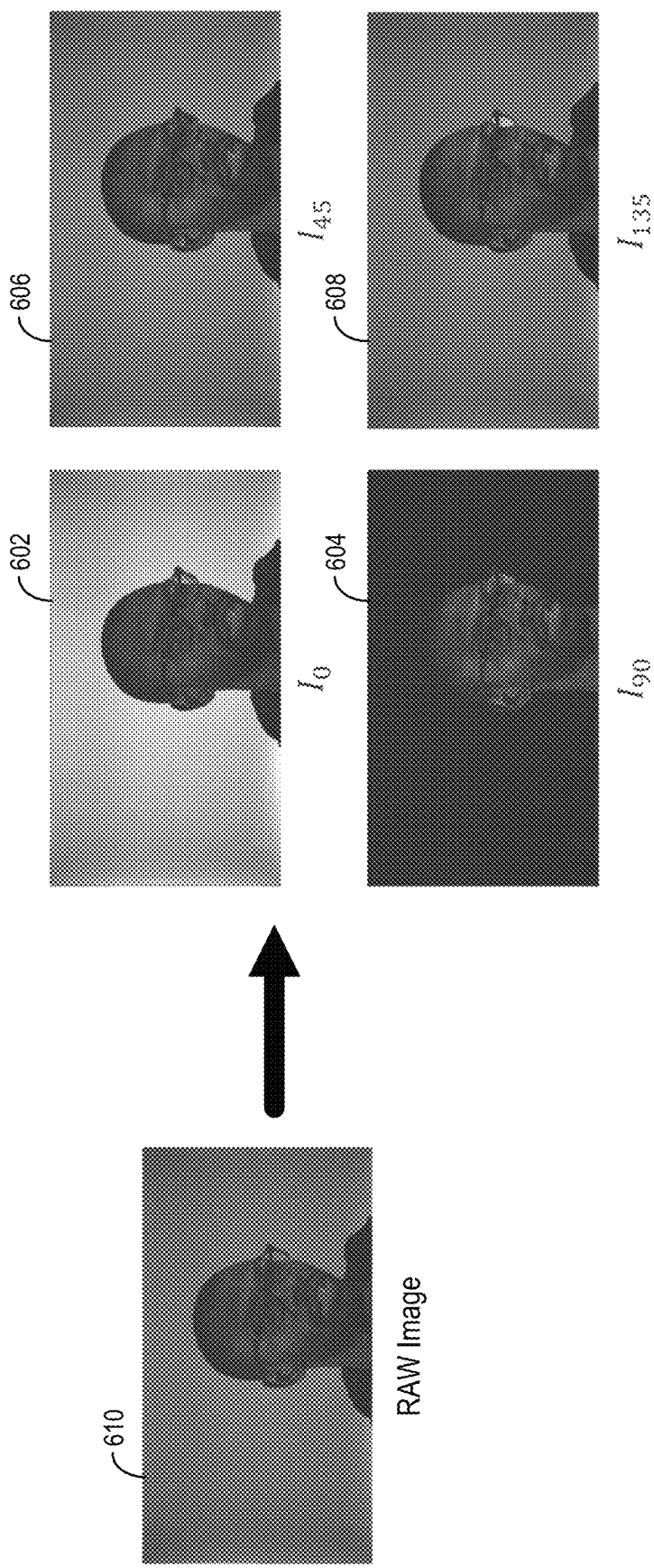
FIG. 6 illustrates the video matte preparation system demosaicing a raw digital video into a plurality of polarized digital videos in accordance with one or more embodiments.

As mentioned above, the video matte preparation system 102 can demosaic a digital video to extract the plurality of polarized digital videos from the digital video. For instance, FIG. 6 illustrates the video matte preparation system 102 generating polarized digital videos by demosaicing a raw digital video in accordance with one or more embodiments. Specifically, FIG. 6 shows the video matte preparation system 102 identifying a raw digital video 610 portraying an animation of a foreground subject backlit by a polarized light source. The video matte preparation system 102 demosaics the raw digital video 610 to extract polarized digital videos 602-608. As illustrated in FIG. 6, the polarized digital videos 602-608 comprise corresponding frames. For instance, FIG. 6 shows a frame of the polarized digital video 602, a corresponding frame of the polarized digital video 604, a corresponding frame of the polarized digital video 606, and a corresponding frame of the polarized digital video 608. Each polarized digital video portrays light having different polarization angles (e.g., 0, 90, 45, and 135 degrees).

In some embodiments, the video matte preparation system 102 obtains (e.g., receives, identifies, captures, etc.) the raw digital video 610. The raw digital video 610 comprises an array of pixels depicting light of various polarizations and/or colors. For instance, the raw digital video 610 comprises pixels specific to a first polarization angle, pixels specific to a second polarization angle, pixels specific to a third polarization angle, and pixels specific to a fourth polarization angle. As other example, the raw digital video 610 comprises pixels specific to a red color, pixels specific to a green color, and pixels specific to a blue color. To illustrate further, some pixels of the raw digital video 610 are specific to red color at a first polarization angle, while some pixels of the raw digital video 610 are specific to a red color at a second polarization angle, etc. For example, a digital camera with a color and polarization filter comprising three unique color channels (e.g., RGB) and four unique polarization channels (e.g., 0, 45, 90, and 135 degrees) comprises twelve unique channels for each of the combinations of the unique colors and the unique polarization angles.

In some implementations, the video matte preparation system 102 demosaics the raw digital video 610 by separating the pixels from the unique polarization channels into corresponding polarized digital videos. For each polarized digital video, the video matte preparation system 102 interpolates between retained pixels to fill in gaps from removed pixels. For example, the video matte preparation system 102 applies nearest-neighbor interpolation, bilinear interpolation, or bicubic interpolation on a grid comprising pixels of like polarization angle. In some implementations, the video matte preparation system 102 retains full color data in the polarized digital videos (e.g., the video matte preparation system 102 extracts polarized digital videos, each comprising red, green, and blue pixels). In some implementations, the video matte preparation system 102 separates colors as well as polarization angles (e.g., the video matte preparation system 102 extracts polarized digital videos comprising only red pixels, extracts other polarized digital videos comprising only green pixels, and extracts other polarized digital videos comprising only blue pixels). In some embodiments, the video matte preparation system 102 demosaics the raw digital video 610 utilizing other techniques suitable for demosaicing polarized images.

Figure 7:
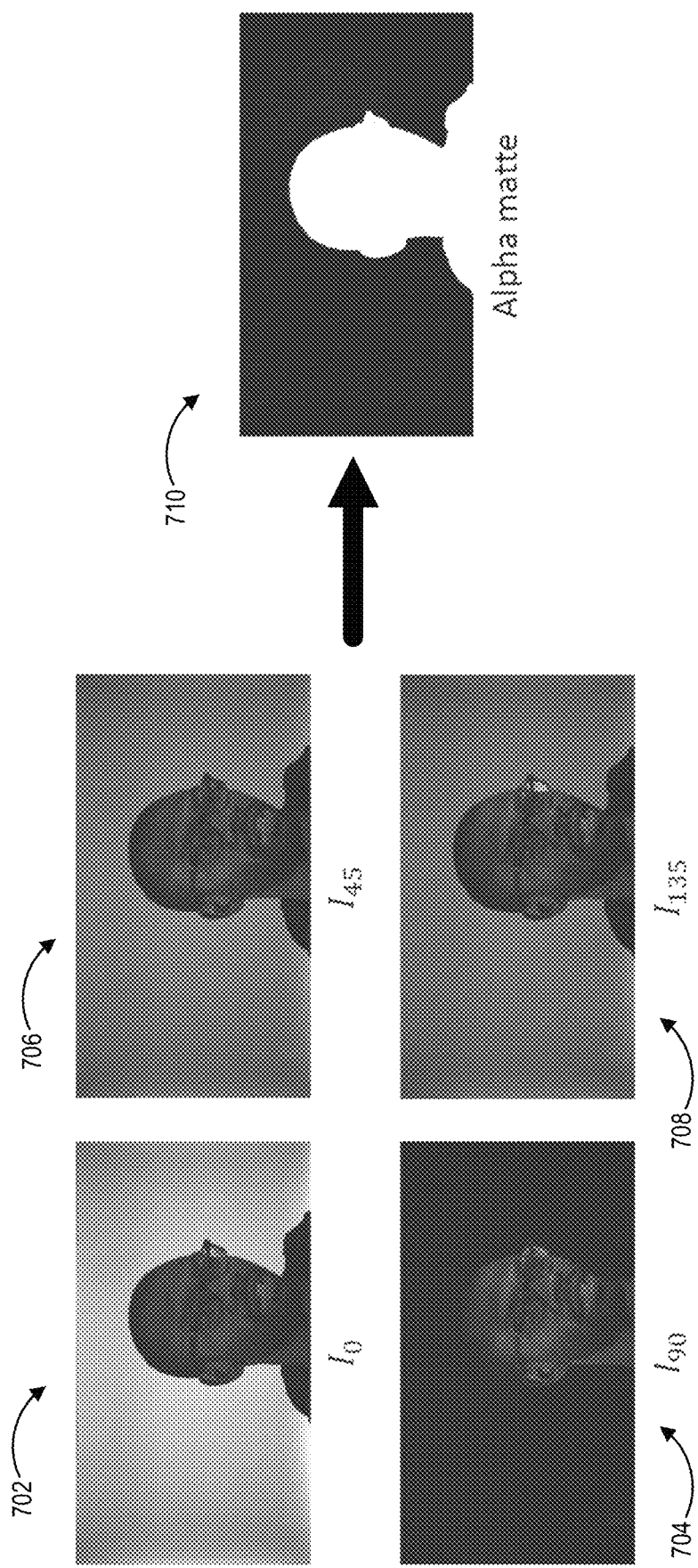
FIG. 7 illustrates the video matte preparation system generating an alpha matte animation utilizing polarized digital videos in accordance with one or more embodiments.

As mentioned previously, the video matte preparation system 102 can generate an alpha matte animation from the plurality of polarized digital videos. For instance, FIG. 7 illustrates, in accordance with one or more embodiments, the video matte preparation system 102 generating an alpha matte 710 (e.g., a frame of the alpha matte animation) from corresponding frames 702-708 of the plurality of polarized digital videos.

In some embodiments, the video matte preparation system 102 solves an optimization problem to generate the alpha matte animation. To illustrate, the video matte preparation system 102 models a quadratic programming problem for each pixel in a given frame of the digital video based on intensities of the corresponding pixels of the corresponding frames of the plurality of corrected polarized digital videos (or, alternatively, the plurality of polarized digital videos). For each pixel, the video matte preparation system 102 solves the quadratic programming problem to determine an alpha value for that pixel, thereby populating the alpha matte animation. In some embodiments, the video matte preparation system 102 utilizes a quadratic optimization library to solve the quadratic programming problem. For example, the video matte preparation system 102 iteratively determines alpha values that satisfy constraints of the quadratic programming problem until a cost function is minimized.

In one or more embodiments, the video matte preparation system 102 models a quadratic programming problem for a group of nearby pixels (e.g., a group of ten adjacent pixels or a group of sixteen adjacent pixels) in a given frame of the digital video based on intensities of the corresponding pixels of the group of nearby pixels of the corresponding frames of the plurality of corrected polarized digital videos (or, alternatively, the plurality of polarized digital videos). For the group of nearby pixels, the video matte preparation system 102 solves the quadratic programming problem to determine alpha values for that group of pixels, thereby populating the alpha matte animation. By grouping pixels in the quadratic programming problem in this way, the video matte preparation system 102 can increase efficiency (e.g., fewer total optimizations to solve) without sacrificing the accuracy of the quadratic programming solution.

By solving the quadratic programming problem, the video matte preparation system 102 can remove polarized or partially polarized reflections off of the foreground subject, yielding an alpha matte that captures fine details of the foreground subject without visual artifacts introduced by polarized reflections. For instance, if the foreground subject includes dielectric materials or has surfaces with a shiny quality, unpolarized ambient light may reflect off of the foreground subject partially polarized. The reflections of partially polarized light off of the foreground subject can cause visual artifacts in some of the polarized digital videos. However, the video matte preparation system 102 can eliminate or reduce such visual artifacts when solving the quadratic programming problem.

For example, in some implementations, the video matte preparation system 102 generates alpha mattes utilizing one or more approaches described in INSTANT MASKS WITH POLARIZED LIGHT, U.S. patent application Ser. No. 17/536,384, filed on Nov. 29, 2021, the contents of which are incorporated by reference herein in their entirety.

In some embodiments, the video matte preparation system 102 generates alpha mattes utilizing a machine-learning model, such as a neural network. For instance, the video matte preparation system 102 processes the polarized digital videos utilizing an alpha-matte generation neural network trained to analyze polarized digital videos and predict pixel-wise locations of one or more foreground subjects in the polarized digital videos. The video matte preparation system 102 thereby utilizes the alpha-matte generation neural network to map the one or more foreground subjects onto an alpha matte animation. In this way, the video matte preparation system 102 can increasing efficiency of alpha matte preparation. For instance, in some cases the video matte preparation system 102 generates alpha matte animations faster by utilizing the alpha-matte generation neural network than by utilizing other matting techniques. In some embodiments, the video matte preparation system 102 trains the alpha-matte generation neural network, for example, utilizing training datasets generated as described herein.

Figure 8:
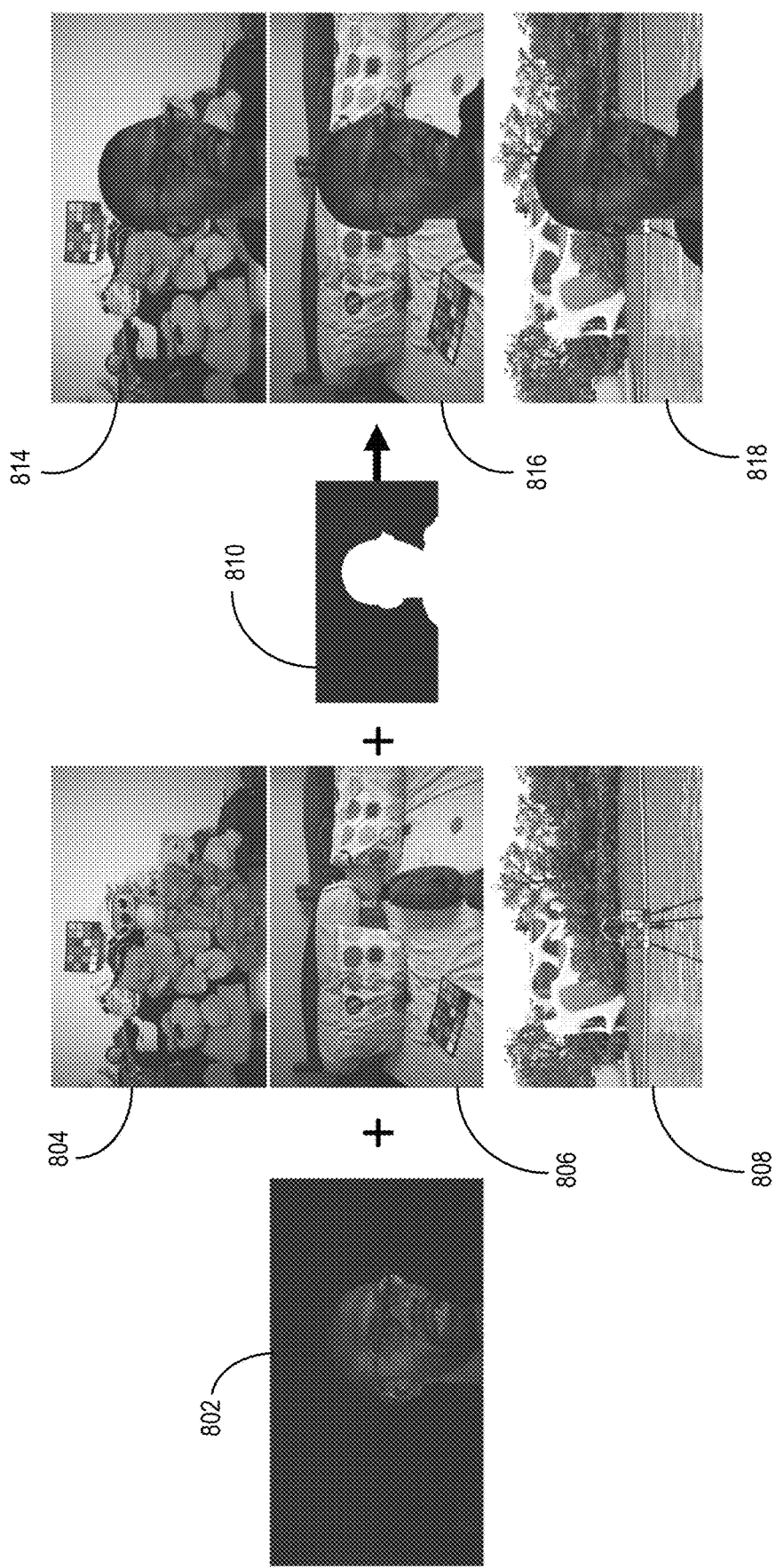
FIG. 8 illustrates the video matte preparation system generating modified digital videos utilizing an alpha matte animation in accordance with one or more embodiments.

As discussed above, the video matte preparation system 102 can composite the foreground subject with the replacement background to create a modified digital video. For instance, FIG. 8 illustrates the video matte preparation system 102 generating a modified digital video by combining the animation of the foreground subject and a replacement background utilizing the alpha matte animation in accordance with one or more embodiments. Specifically, FIG. 8 shows the video matte preparation system 102 compositing the foreground subject onto three different replacement backgrounds to generate three different modified digital videos.

To illustrate, FIG. 8 depicts a frame 802 of a digital video portraying the foreground subject to be composited onto the replacement background. In some embodiments, the video matte preparation system 102 utilizes a raw digital video (e.g., the raw digital video 610) to composite the foreground subject with the replacement background. Alternatively, in some embodiments, the frame 802 is the frame 504 from the second polarized digital video comprising polarized light at an angle orthogonal to the polarization angle of the polarized light source. Thus, in some embodiments, the video matte preparation system 102 utilizes one of the polarized digital videos to composite the foreground subject with the replacement background. Moreover, in some embodiments, the frame 802 is the frame 524 from the second corrected polarized digital video comprising polarized light at an angle orthogonal to the polarization angle of the polarized light source, and corrected for intensity differences using techniques as described above. Thus, in some embodiments, the video matte preparation system 102 utilizes one of the corrected polarized digital videos to composite the foreground subject with the replacement background.

By utilizing the second corrected polarized digital video (i.e., the corrected polarized digital video that comprises polarized light at an angle orthogonal to the polarization angle of the polarized light source) to composite the foreground subject onto the replacement background (as noted above for some embodiments), the video matte preparation system 102 can minimize (e.g., eliminate) edge lighting on the foreground subject from the polarized light source. In particular, because the second corrected polarized digital video comprises polarized light at an angle orthogonal to the polarization angle of the polarized light source, the light from the polarized light source is blocked by the polarized filter associated with the second corrected polarized digital video. Thus, in one or more implementations, the second corrected polarized digital video does not include light from the polarized light source, and therefore portrays the foreground subject without edge lighting surrounding the foreground subject.

As further illustrated in FIG. 8, in some embodiments, the video matte preparation system 102 generates one or more modified digital videos. To demonstrate, the video matte preparation system 102 overlays the foreground subject from frame 802 onto replacement background frame 804 to generate frame 814 of a first modified digital video. Additionally, the video matte preparation system 102 overlays the foreground subject from frame 802 onto replacement background frame 806 to generate frame 816 of a second modified digital video. Further, the video matte preparation system 102 overlays the foreground subject from frame 802 onto replacement background frame 808 to generate frame 818 of a third modified digital video.

To combine (e.g., composite, overlay, superimpose, etc.) the animation of the foreground subject and a replacement background to generate a modified digital video, the video matte preparation system 102 utilizes the alpha matte animation. As illustrated in FIG. 8, the video matte preparation system 102 utilizes frame 810 of the alpha matte animation to generate frames 814, 816, and 818 of the first, second, and third modified digital videos. The frame 810 informs the video matte preparation system 102 for how to combine the animation of the foreground subject and the replacement background. For example, based on pixel values of the frame 810 of the alpha matte animation, the video matte preparation system 102 assigns weights to corresponding pixels of the frame 802 and the frame 804 to generate the frame 814. For instance, if a pixel of the frame 810 has a value of one (e.g., a white pixel as shown in FIG. 8), the video matte preparation system 102 populates the corresponding pixel of the frame 814 with the full value of the corresponding pixel of the frame 802, and none of the corresponding pixel of the frame 804. Conversely, if a pixel of the frame 810 has a value of zero (e.g., a black pixel as shown in FIG. 8), the video matte preparation system 102 populates the corresponding pixel of the frame 814 with the full value of the corresponding pixel of the frame 804, and none of the corresponding pixel of the frame 802. Moreover, if a pixel of the frame 810 has a value of between zero and one (e.g., a gray pixel), the video matte preparation system 102 populates the corresponding pixel of the frame 814 with a weighted combination of the value of the corresponding pixel of the frame 802 and the value of the corresponding pixel of the frame 804.

To illustrate, in some embodiments, the video matte preparation system 102 determines a weighted average of pixels of the animation of the foreground subject and the replacement background in the RGB color space, wherein the weights are based on the values of the corresponding pixels of the alpha matte animation. For instance, the video matte preparation system 102 averages the red portion of a pixel of the frame 802 with the red portion of a corresponding pixel of the frame 804 to generate the red portion of a corresponding pixel of the frame 814. Likewise, the video matte preparation system 102 averages, respectively, the green and blue portions of those pixels of the frames 802 and 804 to generate the green and blue portions of the corresponding pixel of the frame 814. Alternatively, in some embodiments, the video matte preparation system 102 averages pixels of the animation of the foreground subject and the replacement background in a different color space (e.g., RYB, LAB, HSL, HSV). In some embodiments, the video matte preparation system 102 averages pixels of the animation of the foreground subject and the replacement background in a grayscale space.

As mentioned above, in some implementations, the video matte preparation system 102 generates a training dataset utilizing the techniques disclosed herein. For instance, the video matte preparation system 102 generates one or more modified digital videos (e.g., the first, second, and third modified digital videos comprising, respectively, the frames 814, 816, and 818). The video matte preparation system 102 stores and/or transmits the one or more modified digital videos to be used as one or more machine-learning training videos for the training dataset. Furthermore, the video matte preparation system 102 generates one or more alpha matte animations (e.g., the alpha matte animation comprising the frame 810). The video matte preparation system 102 stores and/or transmits the one or more alpha matte animations to be used as one or more ground truth alpha matte animations for the one or more machine-learning training videos. To illustrate, the machine-learning training video(s) and the ground truth alpha matte animation(s) can be used to train a machine-learning model to generate new alpha matte animations for use in video matting systems. By generating multiple modified videos with different replacement backgrounds from one source animation of a foreground subject (e.g., as illustrated in FIG. 8), the video matte preparation system 102 efficiently generates video matting datasets for machine-learning models.

Figure 9:
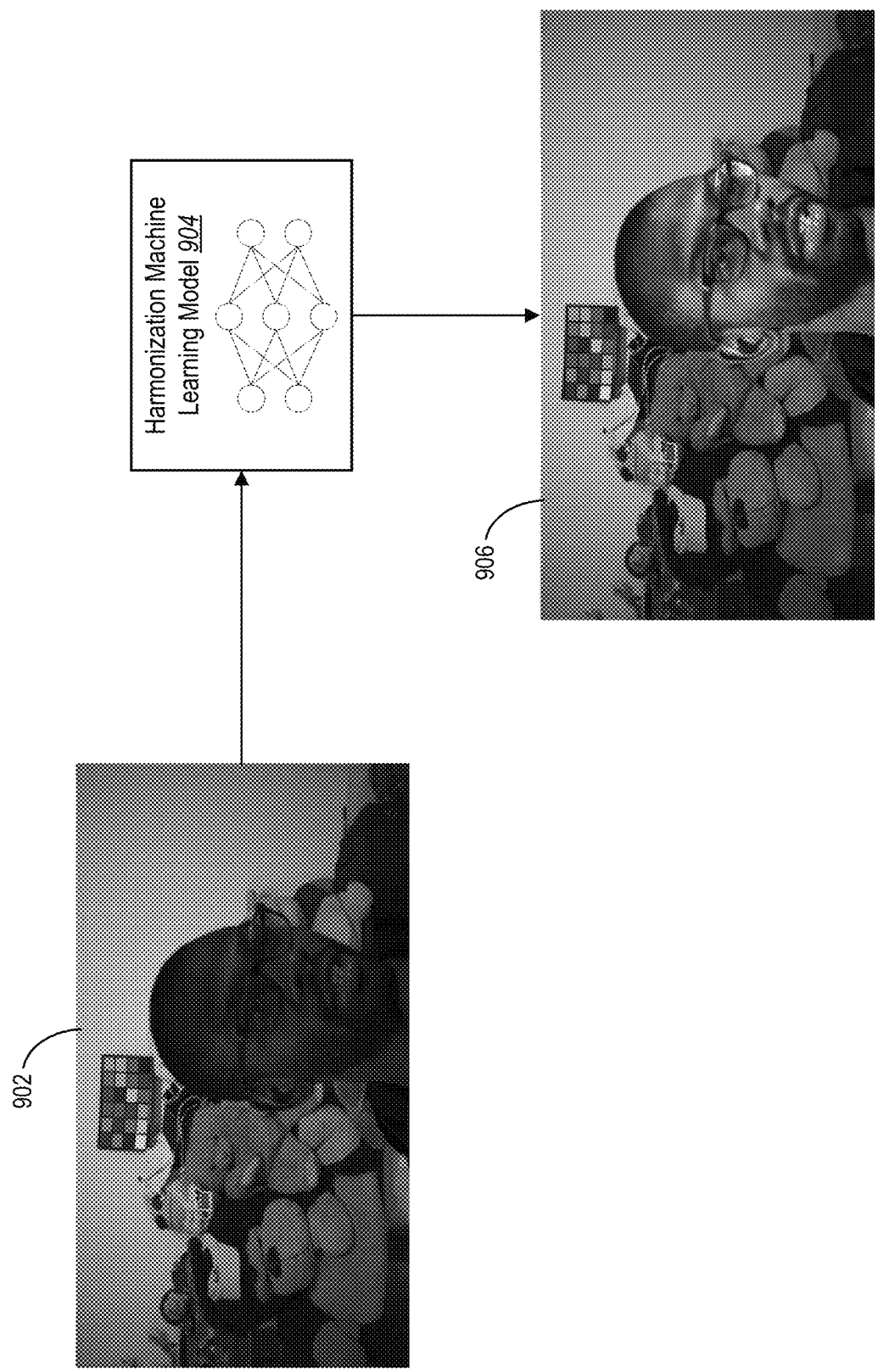
FIG. 9 illustrates the video matte preparation system harmonizing an animation of a foreground subject with a replacement background in accordance with one or more embodiments.

Moving to FIG. 9, the video matte preparation system 102 can harmonize the foreground subject with the replacement background. For instance, FIG. 9 illustrates the video matte preparation system 102 generating the modified digital video, including harmonizing the foreground subject with the replacement background. Specifically, FIG. 9 shows the video matte preparation system 102 utilizing a harmonization machine learning model to harmonize the animation of the foreground subject with the replacement background.

To illustrate, the video matte preparation system 102 utilizes the harmonization machine learning model 904 to analyze frame 902 of a modified digital video to determine luminosity differences between the foreground subject and the replacement background. Based on the luminosity differences, the video matte preparation system 102 utilizes the harmonization machine learning model 904 to adjust pixels of the foreground subject to reduce the luminosity differences. For example, as illustrated in FIG. 9, the video matte preparation system 102 utilizes the harmonization machine learning model 904 to increase light intensities and/or adjust color values for some or all of the pixels representing the foreground subject. In this way, the video matte preparation system 102 generates frame 906 to construct a harmonized digital video.

The video matte preparation system 102 utilizes any of a variety of harmonization machine learning models 904. In some implementations of the video matte preparation system 102, the harmonization machine learning model 904 utilizes spatial domain methods to determine image gradients and/or frequencies in the frame 902 of the modified digital video. For example, the video matte preparation system 102 utilizes the harmonization machine learning model 904 to determine spatial derivatives of illumination and applies white balancing to normalize lighting conditions and generate the frame 906 of the harmonized digital video.

In some embodiments of the video matte preparation system 102, the harmonization machine learning model 904 utilizes color domain methods to analyze bright pixels and/or dark pixels for illuminant estimation. For instance, the video matte preparation system 102 utilizes the harmonization machine learning model 904 to estimate illumination directions considering first and second order moments of color, and to determine bright and dark pixels based on projections of color points in the color domain.

In one or more embodiments, the video matte preparation system 102 can train the harmonization machine learning model 904 to harmonize the foreground subject with the replacement background. For example, as discussed above, the video matte preparation system 102 can analyze a variety of input animations of a foreground subject and replacement backgrounds, and predict an optimal harmonized digital video based on the animations and the replacement backgrounds. The video matte preparation system 102 can utilize a ground truth harmonized digital video to train the harmonization machine learning model 904 to select harmonization parameters for any particular input animation of a foreground subject and replacement background.

In some implementations, the video matte preparation system 102 utilizes one or more of a variety of computer-implemented algorithms for the harmonization machine learning model 904. For example, the video matte preparation system 102 utilizes a trained neural network or a decision tree machine learning model. For instance, the video matte preparation system 102 can train the harmonization machine learning model 904 to select harmonization parameters based on a variety of input features, such as luminosity of a replacement background, luminosity of the animation of the foreground subject, overall colors of the replacement background, and/or overall color of the animation of the foreground subject.

To illustrate, the video matte preparation system 102 encodes these input features (e.g., utilizing one-hot encoding or an embedding network). The video matte preparation system 102 can utilize layers having learned parameters to process the encoded features. At each layer, the neural network can generate intermediate latent feature vectors representing weighted features according to the learned parameters of the network. Utilizing a variety of activation, pooling, convolution, normalization, and/or dropout layers, the neural network can generate a prediction (e.g., harmonization parameters, a harmonized foreground subject, and/or a harmonized digital video).

During training, the video matte preparation system 102 can learn parameters of the harmonization machine learning model 904. For example, the video matte preparation system 102 can compare predictions generated by the harmonization machine learning model 904 with ground truth predictions (e.g., ground truth harmonized digital videos). In some implementations, the video matte preparation system 102 utilizes a loss function to determine a measure of loss between the prediction and the ground truth. The video matte preparation system 102 then modifies parameters of the harmonization machine learning model 904 utilizing the measure of loss. For example, the video matte preparation system 102 utilizes gradient descent and backpropagation to modify the parameters of the harmonization machine learning model 904 to reduce the measure of loss. The video matte preparation system 102 can iteratively modify parameters utilizing training predictions and ground truths to train the harmonization machine learning model 904.

The video matte preparation system 102 can utilize a similar approach to train a machine-learning model to generate alpha matte animations. Indeed, as described above, the video matte preparation system 102 can prepare a training dataset comprising composite digital videos (machine-learning training videos) and ground truth alpha matte animations. The video matte preparation system 102 can utilize the approach just described to train the machine-learning model. For example, the video matte preparation system 102 can utilize the machine learning model to analyze an input machine-learning training video and generate a predicted alpha matte animation. The video matte preparation system 102 can then compare the predicted alpha matte animation with the ground truth alpha matte animation to determine a measure of loss. The video matte preparation system 102 can then modify parameters of the machine-learning model to more accurately generate alpha matte animations. Upon training the machine-learning model, in some embodiments, the video matte preparation system 102 utilizes the machine-learning model to generate alpha mattes (or alpha matte animations) from input images and/or input videos (e.g., from new captured images/videos portraying a subject in a foreground in front of a background).

Figure 10B:
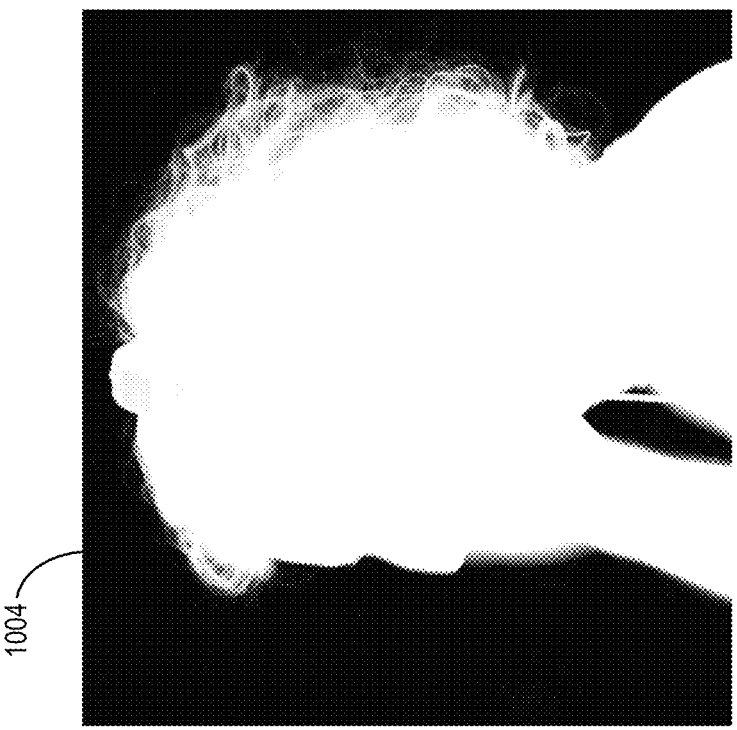
FIGS. 10A and 10B illustrate outputs of the video matte preparation system in accordance with one or more embodiments.
Figure 10A:
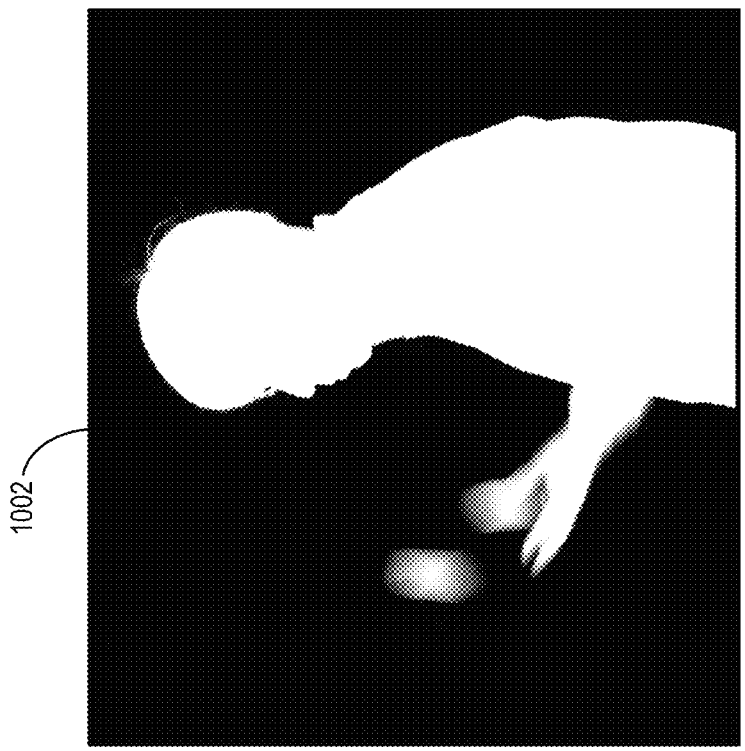

FIGS. 10A and 10B illustrate example modified digital images generated by the video matte preparation system 102. For instance, as depicted in FIG. 10A, the video matte preparation system 102 generated an alpha matte animation from a video of a profile view of a person juggling objects with one hand. FIG. 10A depicts a frame 1002 from the alpha matte animation of the juggler. As can be seen in the frame 1002, the video matte preparation system 102 captures motion blur of the juggled objects within the alpha matte animation. To illustrate, the video matte preparation system 102 captures motion blur in the alpha matte animation by assigning, for pixels located within the motion blur, values between fully transparent and fully opaque. In other words, for pixels at the locations of motion blur, the video matte preparation system 102 combines colors of the foreground subject with colors of the replacement background, thereby preserving the appearance of motion by the foreground subject without sacrificing detail of the replacement background behind the juggled objects.

For another example, as depicted in FIG. 10B, the video matte preparation system 102 generated an alpha matte animation from a video of a profile view of a person with wavy hair. FIG. 10B depicts a frame 1004 from the alpha matte animation of the person with wavy hair. As can be seen in the frame 1004, the video matte preparation system 102 captures fine details of the wavy hair in the alpha matte animation. To illustrate, the video matte preparation system 102 captures fine details in the alpha matte animation by assigning, for pixels located in and around the wavy hair, values between fully transparent and fully opaque. In other words, for pixels at the locations of wavy hair, the video matte preparation system 102 combines colors of the foreground subject with colors of the replacement background, thereby preserving the appearance of the wavy hair of the person without sacrificing detail of the replacement background behind the wavy hair.

Figure 11:
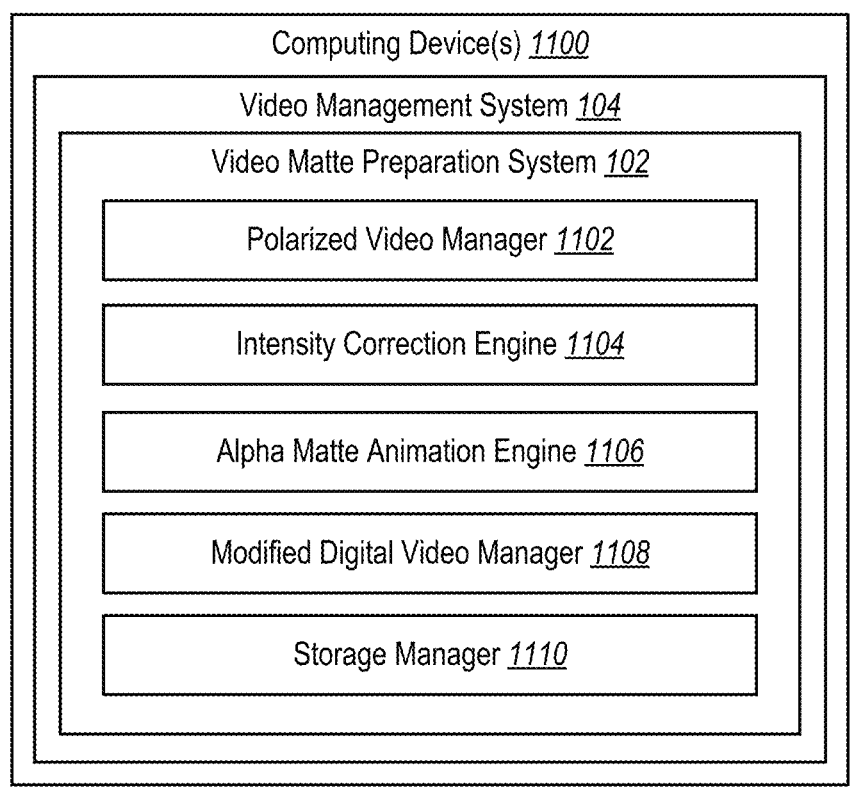
FIG. 11 illustrates a schematic diagram of an example architecture of a video matte preparation system in accordance with one or more embodiments.

Turning now to FIG. 11, additional detail will be provided regarding components and capabilities of one or more embodiments of the video matte preparation system 102. In particular, FIG. 11 illustrates an example video matte preparation system 102 executed by a computing device(s) 1100

(e.g., the server devices(s) 106 or the client device 108). As shown by the embodiment of FIG. 11, the computing device(s) 1100 includes or hosts the video management system 104 and/or the video matte preparation system 102. Furthermore, as shown in FIG. 11, the video matte preparation system 102 includes a polarized digital video manager 1102, an intensity correction engine 1104, an alpha matte animation engine 1106, a modified digital video manager 1108, and a storage manager 1110.

As just mentioned, and as shown in FIG. 11, the video matte preparation system 102 includes a polarized digital video manager 1102. The polarized digital video manager 1102 can capture, obtain, receive, create, extract, demosaic, generate, and/or transmit polarized digital videos. For example, as described above, the polarized digital video manager 1102 can capture a polarized digital video portraying a foreground subject backlit by a polarized light source (e.g., utilizing one or more camera devices having one or more polarized filters). The polarized digital video manager 1102 can also temporally and/or spatially crop a polarized digital video (e.g., utilizing markers in marker frames) as described above. The polarized digital video manager 1102 can also demosaic raw digital videos to extract polarized digital videos.

In addition, as illustrated in FIG. 11, the video matte preparation system 102 includes an intensity correction engine 1104. The intensity correction engine 1104 can modify, correct, and/or adjust pixel intensity of one or more polarized digital videos. For example, as discussed above, the intensity correction engine 1104 can determine and apply correction metrics (e.g., scalar correction metrics) and correct intensity across polarized digital images utilizing a closed-form expression.

Moreover, as shown in FIG. 11, the video matte preparation system 102 includes an alpha matte animation engine 1106. The alpha matte animation engine 1106 can generate, create, and/or construct an alpha matte animation. For instance, as described above, the alpha matte animation engine 1106 can generate an alpha matte from corrected polarized digital videos.

Further, FIG. 11 illustrates that the video matte preparation system 102 includes a modified digital video manager 1108. The modified digital video manager 1108 can generate, create, and/or construct a modified digital video. For example, as described above, the modified digital video manager 1108 can composite a foreground subject animation from a digital video and a new background utilizing an alpha matte animation. In addition, the modified digital video manager 1108 can utilize a harmonization machine learning model to harmonize the foreground subject and new background in generating a modified digital video.

Moreover, as shown in FIG. 11, the video matte preparation system 102 includes a storage manager 1110. The storage manager 1110 (implemented by one or more memory devices) stores data for the video matte preparation system 102. For example, the storage manager 1110 can include a polarized digital video, correction metrics, corrected polarized digital videos, alpha matte animations, or modified/composite digital videos.

Each of the components 1102-1110 of the video matte preparation system 102 can include software, hardware, or both. For example, the components 1102-1110 can include one or more instructions stored on a computer-readable storage medium and executable by processors of one or more computing devices, such as a client device or server device. When executed by the one or more processors, the computer-executable instructions of the video matte preparation system 102 can cause the computing device(s) 1100 to perform the methods described herein. Alternatively, the components 1102-1110 can include hardware, such as a special purpose processing device to perform a certain function or group of functions. Alternatively, the components 1102-1110 of the video matte preparation system 102 can include a combination of computer-executable instructions and hardware.

Furthermore, the components 1102-1110 of the video matte preparation system 102 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 1102-1110 may be implemented as a stand-alone application, such as a desktop or mobile application. Furthermore, the components 1102-1110 may be implemented as one or more web-based applications hosted on a remote server. The components 1102-1110 may also be implemented in a suite of mobile device applications or "apps." To illustrate, the components 1102-1110 may be implemented in an application, including but not limited to ADOBE CREATIVE CLOUD, ADOBE PREMIERE, ADOBE ELEMENTS, ADOBE PHOTOSHOP, OR ADOBE LIGHTROOM. The foregoing are either registered trademarks or trademarks of Adobe Inc. in the United States and/or other countries.

Figure 12:
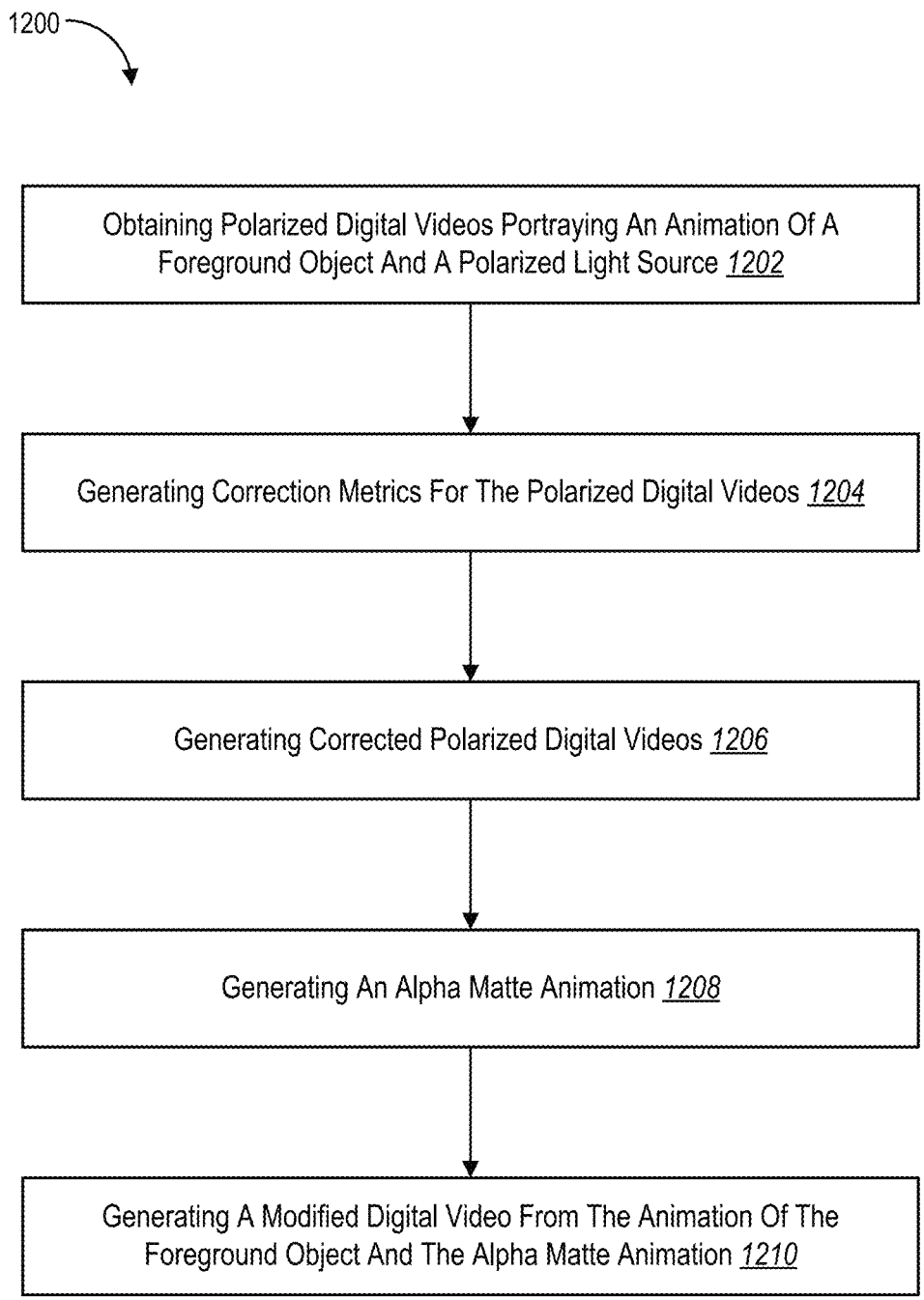
FIG. 12 illustrates a flowchart of a series of acts for generating an alpha matte animation and generating a modified digital video in accordance with one or more embodiments.

FIGS. 1-11, the corresponding text, and the examples provide a number of different methods, systems, devices, and non-transitory computer-readable media of the video matte preparation system 102. In addition to the foregoing, one or more embodiments can also be described in terms of flowcharts comprising acts for accomplishing a particular result, as shown in FIG. 12. FIG. 12 may be performed with more or fewer acts. Further, the acts may be performed in differing orders. Additionally, the acts described herein may be repeated or performed in parallel with one another or parallel with different instances of the same or similar acts. The acts may be performed without user input (i.e., in an automated fashion upon initiation).

As mentioned, FIG. 12 illustrates a flowchart of a series of acts 1200 for generating alpha mattes and/or generating modified digital videos in accordance with one or more embodiments. While FIG. 12 illustrates acts according to one embodiment, alternative embodiments may omit, add to, reorder, and/or modify any of the acts shown in FIG. 12. The acts of FIG. 12 can be performed as part of a method. Alternatively, a non-transitory computer-readable medium can comprise instructions that, when executed by one or more processors, cause a computing device to perform the acts of FIG. 12. In some embodiments, a system can perform the acts of FIG. 12.

As shown in FIG. 12, the series of acts 1200 includes an act 1202 for obtaining polarized digital videos portraying an animation of a foreground subject and a polarized light source. In particular, the act 1202 can include obtaining a plurality of polarized digital videos portraying an animation of a foreground subject and a polarized light source. Moreover, the act 1202 can include obtaining a plurality of polarized digital videos portraying an animation of a foreground subject backlit by a polarized light source. Specifically, the act 1202 can include identifying a digital video portraying the animation of the foreground subject backlit by the polarized light source; and extracting the plurality of polarized digital videos from the digital video. Moreover, the act 1202 can include capturing, utilizing one or more polarized filters of a camera, a digital video portraying the animation of the foreground subject backlit by the polarized light source. Moreover, the act 1202 can include capturing, utilizing a plurality of polarized filters of a camera, a digital video portraying the animation of the foreground subject and the polarized light source. Furthermore, the act 1202 can include capturing a digital video portraying the animation of the foreground subject backlit by the polarized light source.

In particular, the act 1202 can include obtaining a first polarized digital video comprising polarized light at a first angle; obtaining a second polarized digital video comprising polarized light at a second angle orthogonal to the first angle; obtaining a third polarized digital video comprising polarized light at a third angle; and obtaining a fourth polarized digital video comprising polarized light at a fourth angle orthogonal to the third angle. Moreover, the act 1202 can include obtaining a first polarized digital video comprising polarized light at a first angle; obtaining a second polarized digital video comprising polarized light at a second angle orthogonal to the first angle and orthogonal to a polarization angle of the polarized light source; obtaining a third polarized digital video comprising polarized light at a third angle; and obtaining a fourth polarized digital video comprising polarized light at a fourth angle orthogonal to the third angle.

As also shown in FIG. 12, the series of acts 1200 includes an act 1204 for generating correction metrics for the polarized digital videos. In particular, the act 1204 can include generating a plurality of correction metrics by comparing pixel-wise intensity values across corresponding frames of the plurality of polarized digital videos.

Moreover, the act 1204 can include generating a first intensity correction metric based on: intensity values for corresponding first pixels of corresponding first frames of the plurality of polarized digital videos; and a first overall intensity value for the corresponding first pixels of the corresponding first frames of the plurality of polarized digital videos. Furthermore, the act 1204 can include generating a second intensity correction metric based on: intensity values for corresponding second pixels of corresponding second frames of the plurality of polarized digital videos; and a second overall intensity value for the corresponding second pixels of the corresponding second frames of the plurality of polarized digital videos.

As further shown in FIG. 12, the series of acts 1200 includes an act 1206 for generating corrected polarized digital videos. In particular, the act 1206 can include generating a plurality of corrected polarized digital videos by adjusting intensity values of the plurality of polarized digital videos utilizing the plurality of correction metrics. Moreover, the act 1206 can include generating a plurality of corrected polarized digital videos by adjusting intensity values of the plurality of polarized digital videos based on intensity differences across the plurality of polarized digital videos.

Additionally, the act 1206 can include, for a first pixel of a first frame of the plurality of polarized digital videos: generating a first intensity correction metric based on intensity values for corresponding first pixels of corresponding first frames of the first polarized digital video, the second polarized digital video, the third polarized digital video, and the fourth polarized digital video; and generating, based on the first intensity correction metric, adjusted intensity values for the corresponding first pixels of the corresponding first frames of the first polarized digital video, the second polarized digital video, the third polarized digital video, and the fourth polarized digital video. Furthermore, the act 1206 can include, for a second pixel of the first frame of the plurality of polarized digital videos: generating a second intensity correction metric based on intensity values for corresponding second pixels of the corresponding first frames of the first polarized digital video, the second polarized digital video, the third polarized digital video, and the fourth polarized digital video; and generating, based on the second intensity correction metric, adjusted intensity values for the corresponding second pixels of the corresponding first frames of the first polarized digital video, the second polarized digital video, the third polarized digital video, and the fourth polarized digital video.

Moreover, the act 1206 can include generating, based on the first intensity correction metric, a first set of adjusted intensity values for the corresponding first pixels of the corresponding first frames of the plurality of polarized digital videos. Furthermore, the act 1206 can include generating, based on the second intensity correction metric, a second set of adjusted intensity values for the corresponding second pixels of the corresponding second frames of the plurality of polarized digital videos.

In some embodiments, the act 1206 more particularly includes wherein adjusting the intensity values of the plurality of polarized digital videos comprises solving a closed-form expression of intensity values for the first polarized digital video, the second polarized digital video, the third polarized digital video, and the fourth polarized digital video.

As next shown in FIG. 12, the series of acts 1200 includes an act 1208 for generating an alpha matte animation. In particular, the act 1208 can include generating a plurality of alpha mattes from the plurality of corrected polarized digital videos. Moreover, the act 1208 can include generating an alpha matte animation comprising a plurality of alpha mattes from the plurality of corrected polarized digital videos. Alternatively, the act 1208 can include generating a plurality of alpha mattes from the plurality of polarized digital videos. Moreover, the act 1208 can include generating an alpha matte animation comprising a plurality of alpha mattes from the plurality of polarized digital videos. Specifically, the act 1208 can include generating the alpha matte animation comprising the plurality of alpha mattes by solving a quadratic programming problem for a group of a plurality of nearby pixels. Furthermore, the act 1208 can include generating the alpha matte animation by utilizing an alpha-matte generation neural network to process the plurality of polarized digital videos.

As further shown in FIG. 12, the series of acts 1200 includes an act 1210 for generating a modified digital video from the animation of the foreground subject and the alpha matte animation. In particular, the act 1210 can include generating a modified digital video from the animation of the foreground subject and the plurality of alpha mattes. Moreover, the act 1210 can include generating a modified digital video by combining the animation of the foreground subject and a replacement background utilizing the alpha matte animation. Additionally, the act 1210 can include combining the animation of the foreground subject as displayed in the second polarized digital video with a replacement background utilizing the plurality of alpha mattes. Furthermore, the act 1210 can include harmonizing, utilizing a harmonization machine learning model, the animation of the foreground subject with the replacement background.

Additionally, the series of acts 1200 can further include wherein the plurality of polarized digital videos comprises marker frames and non-marker frames, wherein the marker frames portray the polarized light source having a plurality of markers. The series of acts 1200 can include spatially cropping the plurality of polarized digital videos utilizing the plurality of markers from the polarized light source portrayed in the marker frames. In particular, the series of acts 1200 can include generating a spatial mask for the non-marker frames based on the plurality of markers from the polarized light source portrayed in the marker frames; and removing portions of the non-marker frames of the plurality of polarized digital videos that are outside of the spatial mask. Alternatively, the series of acts 1200 can further include wherein the plurality of polarized digital videos comprises marker frames portraying the polarized light source having a plurality of markers. The series of acts 1200 can include spatially cropping the plurality of polarized digital videos utilizing the plurality of markers from the polarized light source portrayed in the marker frames by: generating a spatial mask based on the plurality of markers; and removing portions of the plurality of polarized digital videos that are outside of the spatial mask.

Further, the series of acts 1200 can include temporally cropping the plurality of polarized digital videos by removing the marker frames from the plurality of polarized digital videos. Moreover, the series of acts 1200 can include generating a training dataset, wherein generating the modified digital video comprises generating a machine-learning training video for the training dataset, and wherein generating the alpha matte animation comprises generating a ground truth alpha matte animation for the machine-learning training video.

Embodiments of the present disclosure may comprise or utilize a special purpose or general purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or generators and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface generator (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In one or more embodiments, computer-executable instructions are executed on a general purpose computer to turn the general purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program generators may be located in both local and remote memory storage devices.

Embodiments of the present disclosure can also be implemented in cloud computing environments. In this description, "cloud computing" is defined as a subscription model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing subscription model can be composed of various characteristics such as, for example, on-demand self-service, broad network access, resource pooling, rapid elasticity, measured service, and so forth. A cloud-computing subscription model can also expose various service subscription models, such as, for example, Software as a Service ("SaaS"), a web service, Platform as a Service ("PaaS"), and Infrastructure as a Service ("IaaS"). A cloud-computing subscription model can also be deployed using different deployment subscription models such as private cloud, community cloud, public cloud, hybrid cloud, and so forth. In this description and in the claims, a "cloud-computing environment" is an environment in which cloud computing is employed.

Figure 13:
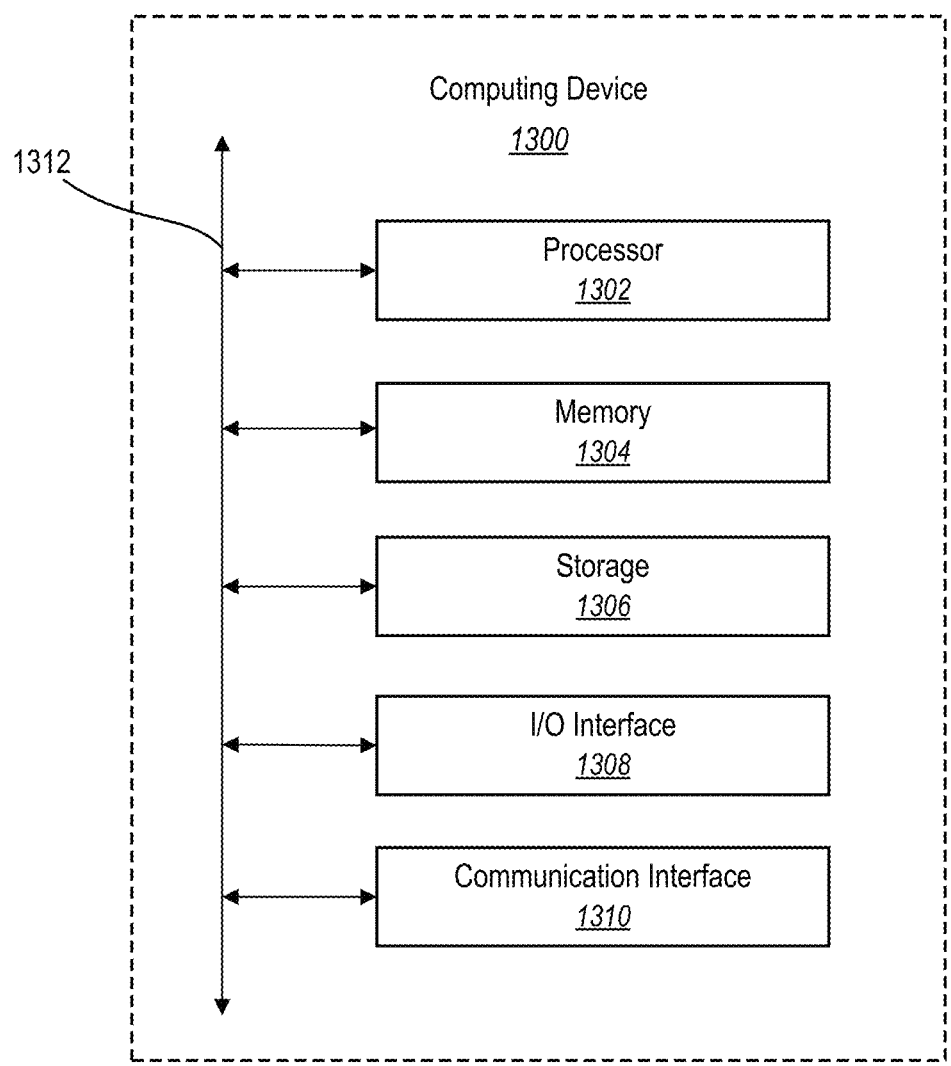
FIG. 13 illustrates a block diagram of an example computing device for implementing one or more embodiments of the present disclosure.

FIG. 13 illustrates a block diagram of an example computing device 1300 that may be configured to perform one or more of the processes described above. One will appreciate that one or more computing devices, such as the computing device 1300 may represent the computing devices described above (e.g., the server device(s) 106 or the client device 108). In one or more embodiments, the computing device 1300 may be a mobile device (e.g., a mobile telephone, a smartphone, a PDA, a tablet, a laptop, a camera, a tracker, a watch, a wearable device, etc.). In some embodiments, the computing device 1300 may be a non-mobile device (e.g., a desktop computer or another type of client device). Further, the computing device 1300 may be a server device that includes cloud-based processing and storage capabilities.

As shown in FIG. 13, the computing device 1300 can include one or more processor(s) 1302, memory 1304, a storage device 1306, input/output interfaces 1308 (or "I/O interfaces 1308"), and a communication interface 1310, which may be communicatively coupled by way of a communication infrastructure (e.g., bus 1312). While the computing device 1300 is shown in FIG. 13, the components illustrated in FIG. 13 are not intended to be limiting. Additional or alternative components may be used in other embodiments. Furthermore, in certain embodiments, the computing device 1300 includes fewer components than those shown in FIG. 13. Components of the computing device 1300 shown in FIG. 13 will now be described in additional detail.

In particular embodiments, the processor(s) 1302 includes hardware for executing instructions, such as those making up a computer program. As an example, and not by way of limitation, to execute instructions, the processor(s) 1302 may retrieve (or fetch) the instructions from an internal register, an internal cache, memory 1304, or a storage device 1306 and decode and execute them.

The computing device 1300 includes the memory 1304, which is coupled to the processor(s) 1302. The memory 1304 may be used for storing data, metadata, and programs for execution by the processor(s). The memory 1304 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1304 may be internal or distributed memory.

The computing device 1300 includes the storage device 1306 for storing data or instructions. As an example, and not by way of limitation, the storage device 1306 can include a non-transitory storage medium described above. The storage device 1306 may include a hard disk drive ("HDD"), flash memory, a Universal Serial Bus ("USB") drive or a combination these or other storage devices.

As shown, the computing device 1300 includes one or more I/O interfaces 1308, which are provided to allow a user to provide input to (such as user strokes), receive output from, and otherwise transfer data to and from the computing device 1300. These I/O interfaces 1308 may include a mouse, keypad or a keyboard, a touch screen, camera, optical scanner, network interface, modem, other known I/O devices or a combination of such I/O interfaces 1308. The touch screen may be activated with a stylus or a finger.

The I/O interfaces 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1308 are configured to provide graphical data to a display for presentation to a user. The graphical data may be representative of one or more graphical user interfaces and/or any other graphical content as may serve a particular implementation.

The computing device 1300 can further include a communication interface 1310. The communication interface 1310 can include hardware, software, or both. The communication interface 1310 provides one or more interfaces for communication (such as, for example, packet-based communication) between the computing device and one or more other computing devices or one or more networks. As an example, and not by way of limitation, communication interface 1310 may include a network interface controller ("NIC") or network adapter for communicating with an Ethernet or other wire-based network or a wireless NIC ("WNIC") or wireless adapter for communicating with a wireless network, such as a WI-FI. The computing device 1300 can further include the bus 1312. The bus 1312 can include hardware, software, or both that connects components of computing device 1300 to each other.

The use in the foregoing description and in the appended claims of the terms "first," "second," "third," etc., is not necessarily to connote a specific order or number of elements. Generally, the terms "first," "second," "third," etc., are used to distinguish between different elements as generic identifiers. Absent a showing that the terms "first," "second," "third," etc., connote a specific order, these terms should not be understood to connote a specific order. Furthermore, absent a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget, and not necessarily to connote that the second widget has two sides.

In the foregoing description, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
obtaining a plurality of polarized digital videos portraying an animation of a foreground subject backlit by a polarized light source;
generating a plurality of corrected polarized digital videos by adjusting intensity values of the plurality of polarized digital videos based on intensity differences across the plurality of polarized digital videos;
generating an alpha matte animation comprising a plurality of alpha mattes from the plurality of corrected polarized digital videos; and
generating a modified digital video by combining the animation of the foreground subject and a replacement background utilizing the alpha matte animation.

2. The method of claim 1, wherein obtaining the plurality of polarized digital videos comprises:
identifying a digital video portraying the animation of the foreground subject backlit by the polarized light source; and
extracting the plurality of polarized digital videos from the digital video.

3. The method of claim 1, wherein the plurality of polarized digital videos comprises marker frames and non-marker frames, wherein the marker frames portray the polarized light source having a plurality of markers, and wherein the method further comprises spatially cropping the plurality of polarized digital videos utilizing the plurality of markers from the polarized light source portrayed in the marker frames.

4. The method of claim 3, further comprising temporally cropping the plurality of polarized digital videos by removing the marker frames from the plurality of polarized digital videos.

5. The method of claim 1, wherein obtaining the plurality of polarized digital videos comprises:
obtaining a first polarized digital video comprising polarized light at a first angle;
obtaining a second polarized digital video comprising polarized light at a second angle orthogonal to the first angle;
obtaining a third polarized digital video comprising polarized light at a third angle; and
obtaining a fourth polarized digital video comprising polarized light at a fourth angle orthogonal to the third angle.

6. The method of claim 5, wherein generating the plurality of corrected polarized digital videos comprises, for a first pixel of a first frame of the plurality of polarized digital videos:
generating a first intensity correction metric based on intensity values for corresponding first pixels of corresponding first frames of the first polarized digital video, the second polarized digital video, the third polarized digital video, and the fourth polarized digital video; and
generating, based on the first intensity correction metric, adjusted intensity values for the corresponding first pixels of the corresponding first frames of the first polarized digital video, the second polarized digital video, the third polarized digital video, and the fourth polarized digital video.

7. The method of claim 6, wherein generating the plurality of corrected polarized digital videos comprises, for a second pixel of the first frame of the plurality of polarized digital videos:
generating a second intensity correction metric based on intensity values for corresponding second pixels of the corresponding first frames of the first polarized digital video, the second polarized digital video, the third polarized digital video, and the fourth polarized digital video; and
generating, based on the second intensity correction metric, adjusted intensity values for the corresponding second pixels of the corresponding first frames of the first polarized digital video, the second polarized digital video, the third polarized digital video, and the fourth polarized digital video.

8. The method of claim 5, wherein adjusting the intensity values of the plurality of polarized digital videos comprises solving a closed-form expression of intensity values for the first polarized digital video, the second polarized digital video, the third polarized digital video, and the fourth polarized digital video.

9. The method of claim 1, further comprising generating a training dataset, wherein generating the modified digital video comprises generating a machine-learning training video for the training dataset, and wherein generating the alpha matte animation comprises generating a ground truth alpha matte animation for the machine-learning training video.

10. A system comprising:
a memory component; and
one or more processing devices coupled to the memory component, the one or more processing devices to perform operations comprising:
obtaining a plurality of polarized digital videos portraying an animation of a foreground subject and a polarized light source;
generating a plurality of correction metrics by comparing pixel-wise intensity values across corresponding frames of the plurality of polarized digital videos;
generating a plurality of corrected polarized digital videos by adjusting intensity values of the plurality of polarized digital videos utilizing the plurality of correction metrics;
generating a plurality of alpha mattes from the plurality of corrected polarized digital videos; and
generating a modified digital video from the animation of the foreground subject and the plurality of alpha mattes.

11. The system of claim 10, wherein obtaining the plurality of polarized digital videos comprises capturing, utilizing one or more polarized filters of a camera, a digital video portraying the animation of the foreground subject and the polarized light source.

12. The system of claim 10, wherein obtaining the plurality of polarized digital videos comprises:

obtaining a first polarized digital video comprising polarized light at a first angle;

obtaining a second polarized digital video comprising polarized light at a second angle orthogonal to the first angle and orthogonal to a polarization angle of the polarized light source;

obtaining a third polarized digital video comprising polarized light at a third angle; and obtaining a fourth polarized digital video comprising polarized light at a fourth angle orthogonal to the third angle.

13. The system of claim 12, wherein generating the modified digital video from the animation of the foreground subject and the plurality of alpha mattes comprises combining the animation of the foreground subject as displayed in the second polarized digital video with a replacement background utilizing the plurality of alpha mattes.

14. The system of claim 10, wherein generating the plurality of correction metrics comprises generating a first intensity correction metric based on:

intensity values for corresponding first pixels of corresponding first frames of the plurality of polarized digital videos; and a first overall intensity value for the corresponding first pixels of the corresponding first frames of the plurality of polarized digital videos; and wherein generating the plurality of corrected polarized digital videos comprises generating, based on the first intensity correction metric, a first set of adjusted intensity values for the corresponding first pixels of the corresponding first frames of the plurality of polarized digital videos.

15. The system of claim 14, wherein generating the plurality of correction metrics comprises generating a second intensity correction metric based on:

intensity values for corresponding second pixels of corresponding second frames of the plurality of polarized digital videos; and a second overall intensity value for the corresponding second pixels of the corresponding second frames of the plurality of polarized digital videos; and wherein generating the plurality of corrected polarized digital videos comprises generating, based on the second intensity correction metric, a second set of adjusted intensity values for the corresponding second pixels of the corresponding second frames of the plurality of polarized digital videos.

16. A non-transitory computer-readable medium storing executable instructions which, when executed by a processing device, cause the processing device to perform operations comprising:

obtaining a plurality of polarized digital videos portraying an animation of a foreground subject backlit by a polarized light source;

generating a plurality of corrected polarized digital videos by adjusting intensity values of the plurality of polarized digital videos based on intensity differences across the plurality of polarized digital videos;

generating an alpha matte animation comprising a plurality of alpha mattes from the plurality of corrected polarized digital videos; and generating a modified digital video by combining the animation of the foreground subject and a replacement background utilizing the alpha matte animation.

17. The non-transitory computer-readable medium of claim 16, wherein generating the alpha matte animation comprising the plurality of alpha mattes comprises solving a quadratic programming problem for a group of a plurality of nearby pixels.

18. The non-transitory computer-readable medium of claim 16, wherein the plurality of polarized digital videos comprises marker frames portraying the polarized light source having a plurality of markers, and wherein the operations further comprise spatially cropping the plurality of polarized digital videos utilizing the plurality of markers from the polarized light source portrayed in the marker frames by:

generating a spatial mask based on the plurality of markers; and removing portions of the plurality of polarized digital videos that are outside of the spatial mask.

19. The non-transitory computer-readable medium of claim 16, wherein generating the modified digital video comprises harmonizing, utilizing a harmonization machine learning model, the animation of the foreground subject with the replacement background.

20. The non-transitory computer-readable medium of claim 16, further comprising generating a training dataset, wherein generating the modified digital video comprises generating a machine-learning training video for the training dataset, and wherein generating the alpha matte animation comprises generating a ground truth alpha matte animation for the machine-learning training video.

* * * * *